(12) United States Patent
Jepson et al.

(10) Patent No.: US 7,058,205 B2
(45) Date of Patent: Jun. 6, 2006

(54) ROBUST, ON-LINE, VIEW-BASED APPEARANCE MODELS FOR VISUAL MOTION ANALYSIS AND VISUAL TRACKING

(75) Inventors: Allan D. Jepson, Oakville (CA); David J. Fleet, Menlo Park, CA (US); Thomas F. El-Maraghi, Toronto (CA)

(73) Assignee: Xerox Corporation, Stamford, CT (US)

( * ) Notice: Subject to any disclaimer, the term of this patent is extended or adjusted under 35 U.S.C. 154(b) by 589 days.

(21) Appl. No.: 10/016,659

(22) Filed: Dec. 7, 2001

(65) Prior Publication Data

US 2003/0108220 A1 Jun. 12, 2003

(51) Int. Cl.
  *G06K 9/00* (2006.01)
(52) U.S. Cl. ..................................... 382/103
(58) Field of Classification Search ............... 382/103, 382/107, 156, 181, 260, 173, 238–239; 348/169
See application file for complete search history.

(56) References Cited

U.S. PATENT DOCUMENTS

| 5,625,715 | A | 4/1997 | Trew et al. | |
| 6,724,915 | B1 * | 4/2004 | Toklu et al. | 382/103 |
| 6,731,799 | B1 * | 5/2004 | Sun et al. | 382/173 |
| 6,741,756 | B1 * | 5/2004 | Toyama et al. | 382/291 |
| 6,798,897 | B1 * | 9/2004 | Rosenberg | 382/107 |

OTHER PUBLICATIONS

Fleet et al, "A Framework for Modeling Appearance Change in Image Sequences", Computer Vision, 1998. Sixth International Conference on, Jan. 4-7, 1998.*
Meier et al.: "Automatic Video Sequence Segmentation Using Object Tracking", Tencon '97 Brisbane-Australia, Proceedings of IEEE Tencon 1997, pp. 283-286.
Jojic et al.: "Learning Mixtures of Smooth, Nonuniform Deformation Models for Probabilistic Image Matching", Eight International Workshop on Artifical Intelligence and Statistics, Jan. 2001, XP-002248199.
Black et al.: "Robustly Estimating Changes in Image Appearance", Computer Vision And Image Understanding, Apr. 2000, Academic Press, USA, vol. 78, No. 1, pp. 8-31, XP-002248200.

* cited by examiner

*Primary Examiner*—Jingge Wu
*Assistant Examiner*—Tom Y. Lu
(74) *Attorney, Agent, or Firm*—Bever, Hoffman & Harms, LLP; Patrick T. Bever

(57) ABSTRACT

A robust, adaptive, appearance model is disclosed that includes both a stable model component, learned over a long time course, and a transient component, learned over a relatively short time course (e.g., a 2-frame motion component and/or an outlier processing component). An on-line EM-algorithm is used to adapt the appearance model parameters over time. An implementation of this approach is developed for an appearance model based on the filter responses from a steerable pyramid. The appearance model is used in a motion-based tracking algorithm to provide robustness in the face of image outliers, such as those caused by occlusions. It is also provides the ability to adapt to natural changes in appearance, such as those due to facial expressions, or variations in 3D pose.

17 Claims, 11 Drawing Sheets

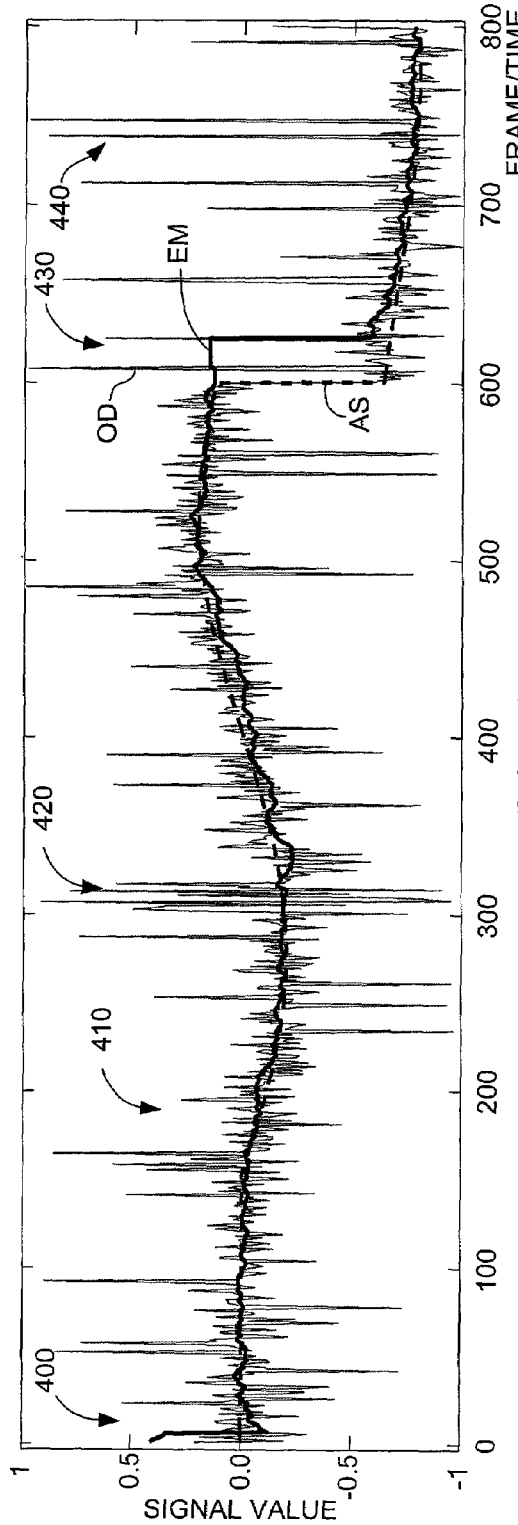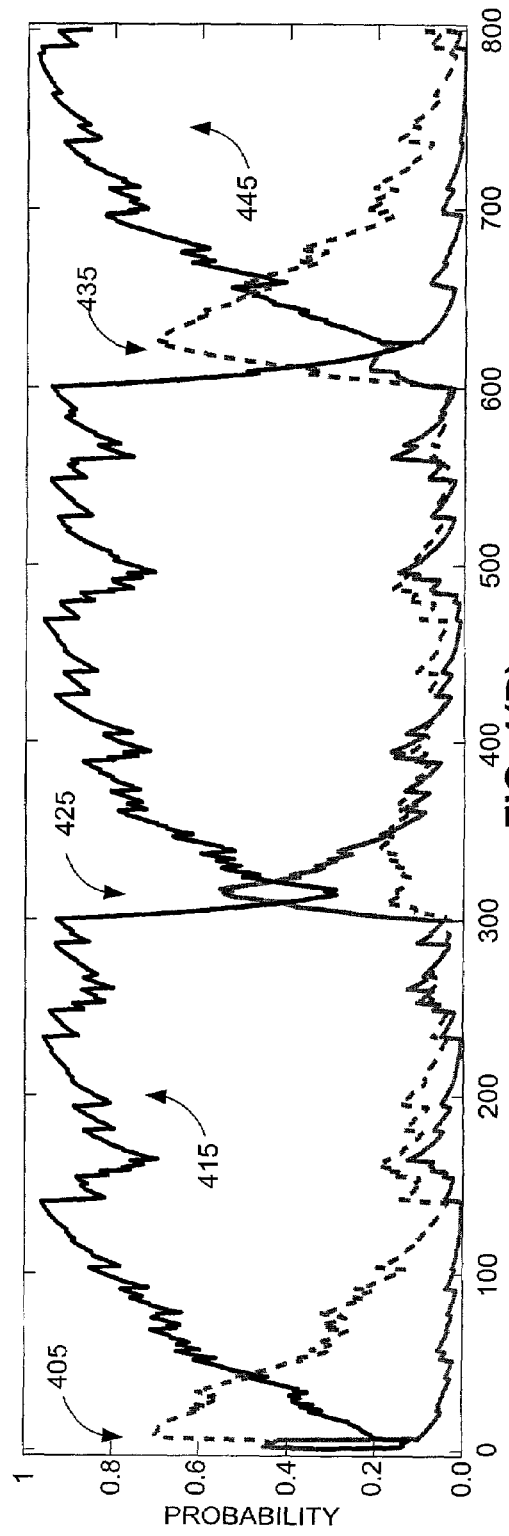
FIG. 4(A)
FIG. 4(B)

| TIME/FRAME | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|---|---|
| DATA | 12 | 12 | 12 | 12 | 12 | 24 | 12 | 12 | 13 | 14 | 14 | 14 | 24 | 24 | 24 | 24 | 24 |
FIG. 5
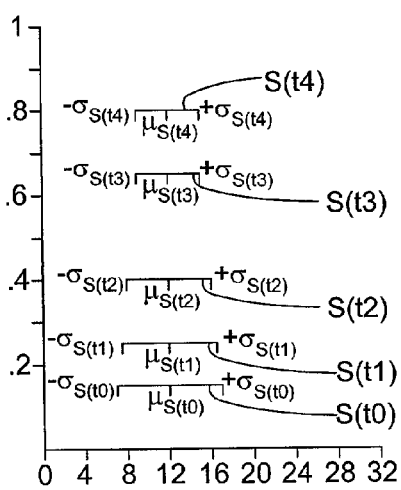
FIG. 6(A)
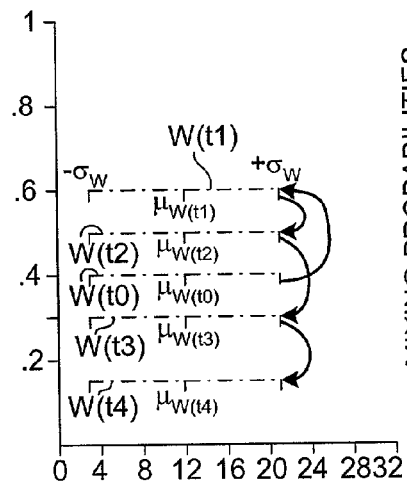
FIG. 6(B)
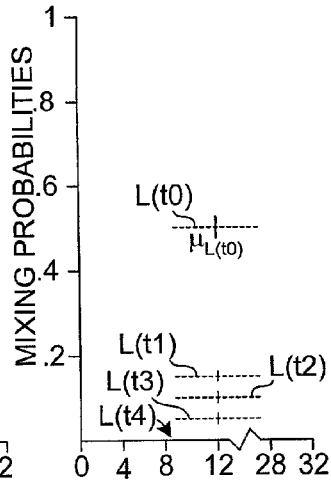
FIG. 6(C)
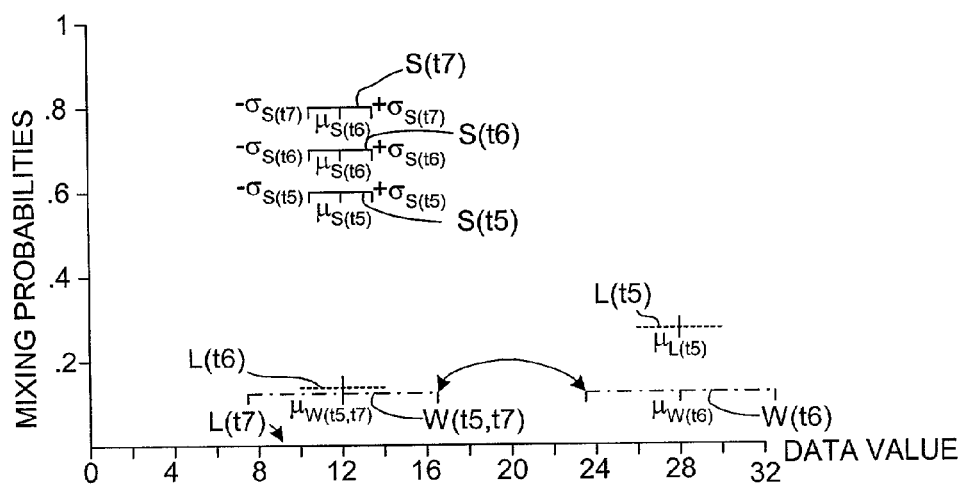
FIG. 7

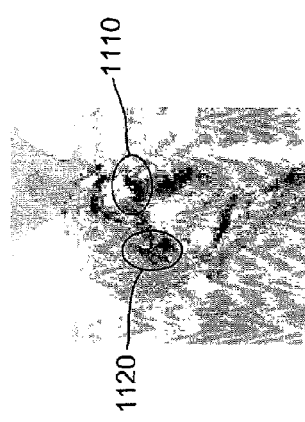
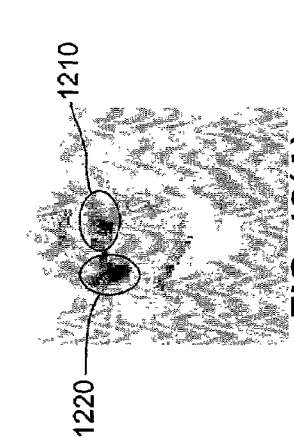
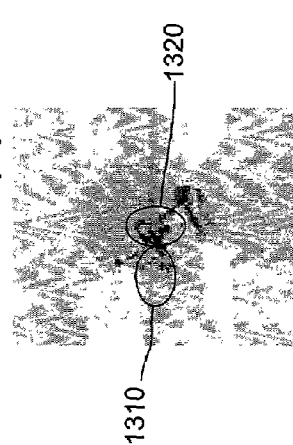
FIG. 11(B)  FIG. 12(B)  FIG. 13(B)
FIG. 11(A)  FIG. 12(A)  FIG. 13(A)
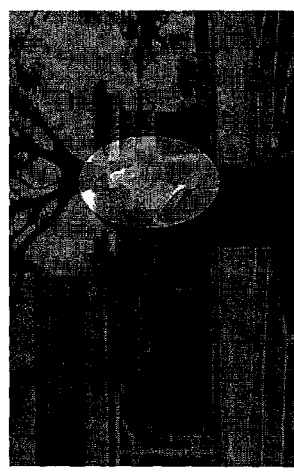
FIG. 10(A)  FIG. 10(B)  FIG. 10(C)

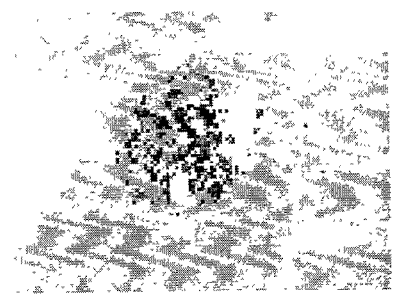
FIG. 18(D)
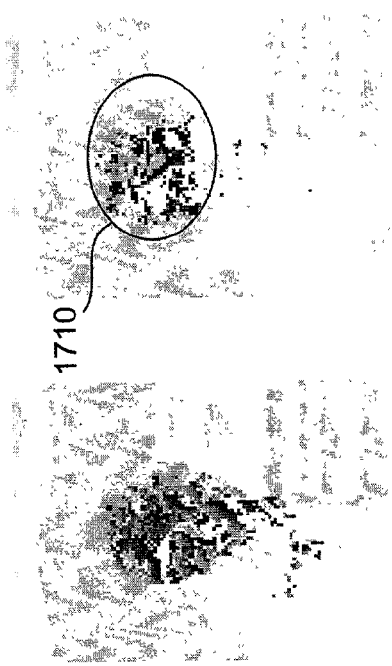
FIG. 17(D)
FIG. 17(C)
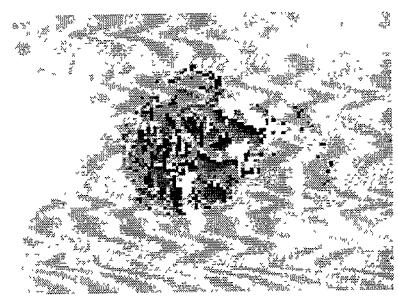
FIG. 18(C)
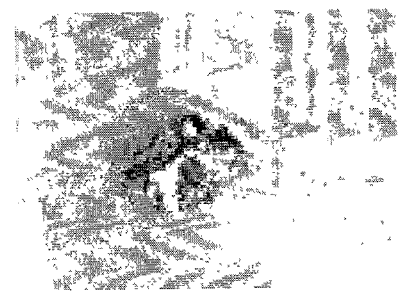
FIG. 17(B)
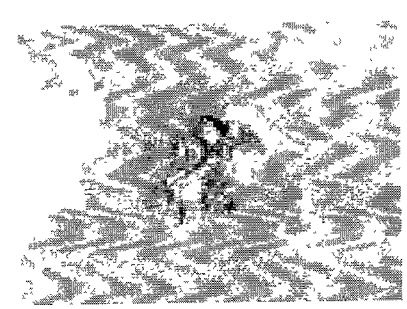
FIG. 18(B)
FIG. 17(A)
FIG. 18(A)

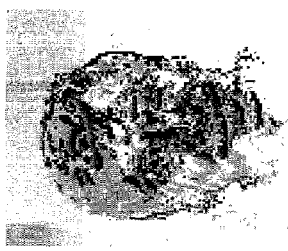
FIG. 20(B)
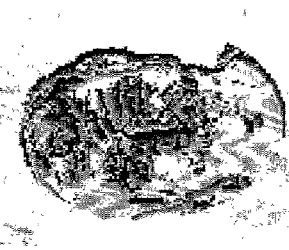
FIG. 21(B)
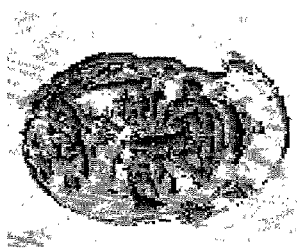
FIG. 22(B)
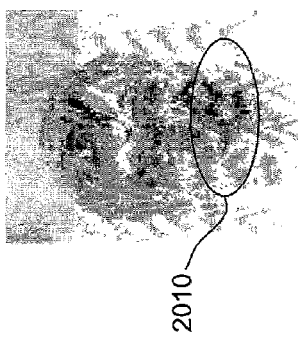
FIG. 20(A)
2010
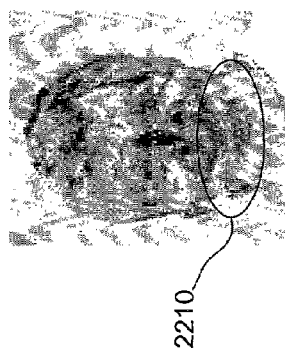
FIG. 21(A)
2110
FIG. 22(A)
2210
FIG. 19(A)
FIG. 19(B)
FIG. 19(C)

ROBUST, ON-LINE, VIEW-BASED APPEARANCE MODELS FOR VISUAL MOTION ANALYSIS AND VISUAL TRACKING

FIELD OF THE INVENTION

The present invention relates generally to a processor-based technique for generating and updating an appearance model, and, more particularly, to a process for generating an appearance model using multiple model components.

BACKGROUND OF THE INVENTION

Automated visual tracking systems are often used to track a target image appearing in a series of image frames. In general, once a target object is identified, the tracking system determines the target object's position in each successive image frame by distinguishing the target object from background and other non-target image data. Such tracking systems often utilize a motion estimation algorithm to predict movement of the target object's position in a new (current) image frame by analyzing movement patterns of the target object in two or more image frames preceding the new frame.

Although not always described as such, conventional motion estimation and tracking systems embody some form of appearance model that is utilized to identify the target object in each image frame. In general, the appearance model is a description of the target object that can be used by the motion estimation/tracking system to distinguish the target object from non-target image data surrounding the target object in each image frame. As the target object changes location, the motion estimation/tracking system identifies each new location by identifying a region of the new frame that satisfies the previously established description provided by the appearance model.

One of the main factors that limits the performance of motion estimation and tracking systems is the failure of the appearance model to adapt to target object appearance changes. The image conveyed by a three-dimensional (3D) target object located in 3D space onto a two-dimensional image frame is typically subjected to image deformations caused by relative displacement between the target object and the image frame generating device (e.g., camera). For example, the size of the target object typically grows larger or smaller when a distance between the target object's position relative to the camera is changed. Similarly, the shape and/or light reflected from the target object typically changes due to changes in orientation of the target object relative to the camera (e.g., rotation or translation of the target object or the camera). In addition, image distortion occurs when a non-target object partially or fully occludes the target object (i.e., becomes located between the target object and the camera). Moreover, complex natural objects (i.e., objects whose appearance is subject to changes that are independent of relative displacement between the target object and the camera, such as changes in facial expression) introduce additional appearance variation that must be accounted for by the appearance model. As described in additional detail below, conventional appearance models, such as template-matching models, global statistical models, 2-frame motion estimation, and temporally filtered motion-compensated image models, fail to account for one or more of these deformations, thereby causing the a motion estimation and tracking system to eventually lose track of a target object.

Template-matching appearance models are pre-learned, fixed image models ("templates") of the target object that are used by a tracking system to identify ("match") the target object in an image frame, thereby determining its location. While such tracking systems can be reliable over short durations (i.e., while the target object's appearance remains consistent with the fixed image model), they cope poorly with the appearance changes of target objects over longer durations that commonly occur in most applications. The reliability of these tracking systems may be improved by representing the variability of each pixel in the template (see B. Frey, "Filling in Scenes by Propagating Probabilities Through Layers into Appearance Models", *Proceedings of the IEEE Conference on Computer Vision and Pattern Recognition*, volume I, pages 185–192, Hilton Head, June 2000). However, a learning stage is required prior to tracking in which the variance of the brightness of the image at each pixel over the training image data is estimated.

The reliability of a tracking system may be enhanced with the use of subspace models of appearance (see, for example, M. J. Black and A. D. Jepson, "EigenTracking: Robust Matching and Tracking of Articulated Objects using a View-Based Representation", *International Journal of Computer Vision*, 26(1):63–84, 1998). Such view-based models, usually learned with Principal Component Analysis, have the advantage of modeling variations in pose and lighting. They can also be used for search as well as incremental tracking. But they also have the disadvantage that they are object specific and they require that training occur before tracking in order to learn the subspace.

The use of local and global image statistics, such as color histograms, have also been used as coarse appearance models for tracking target objects (see, for example, S. Birchfield, "Elliptical Head Tracking Using Intensity Gradients and Color Histograms", *Proc. IEEE Conference on Computer Vision and Pattern Recognition*, pages 232–237, Santa Barbara, June 1998). These appearance models offer robustness when image distortions and occlusions are encountered, are fast to learn, and can be used for searching as well as tracking. However, global statistical descriptions lack a spatial structure of appearance; that is, the ability to distinguish a large number of similarly colored pixels (e.g., a large proportion of red and blue pixels) from the spatial relationship of the colored pixels (e.g., a group of red pixels vertically positioned over a group of blue pixels associated with an image of a red shirt located over blue pants). This lack of expressiveness limits the ability of global statistical descriptions to accurately register the appearance model to the target object in many cases. Additionally, these coarse appearance models can also fail to accurately track objects in regions of interest that share similar statistics with nearby regions.

Motion-based tracking methods integrate motion estimates through time. For 2-frame motion estimation, motion is computed between each consecutive pair of frames. Because motion is computed between each consecutive pair of frames, the only model of appearance used by the motion-based tracking system is the appearance of the target object within the region of interest in the last frame. As a result, errors in this method can quickly accumulate over time. The appearance model in 2-frame motion estimation is able to adapt rapidly to appearance changes. However, the appearance model often drifts away from the target object when the target object changes appearance rapidly. As a result, the region of interest often slides off the target object and onto the background or another object. This is especially problematic when the motions of the target object and background are similar.

Motion-based tracking methods have been improved by accumulating an adaptive appearance model through time. Indeed, optimal motion estimation can be formulated as the estimation of both motion and appearance simultaneously (see Y. Weiss and D. J. Fleet, "Velocity Likelihoods in Biological and Machine Vision", *Probabilistic Models of the Brain: Perception and Neural Function*, pages 81–100, Cambridge, 2001. MIT Press). In this sense, like the learned subspace approaches above, optimal motion estimation is achieved by registering the image against an appearance model that is acquired through time. For example, a stabilized image sequence can be formed from the motion estimates to learn the appearance model. This stabilized image sequence may be smoothed with a recursive low-pass filter, such as a linear IIR low-pass filter, to remove some noise and up-weight the most recent frames. However, linear filtering does not provide measures of stability that produce robustness with respect to occlusions and to local distortions of appearance.

What is needed is a robust, adaptive appearance model for motion-based tracking of complex natural objects. The appearance model should adapt to slowly changing appearance, as well as maintaining a natural measure of the stability of the observed image structure during tracking. The appearance model should be robust with respect to occlusions, significant image deformations, and natural appearance changes like those occurring with facial expressions and clothing. The appearance model framework should support tracking and accurate image alignment for a variety of possible applications, such as localized feature tracking, and tracking models for which relative alignment and position is important, such as limbs of a human body.

SUMMARY OF THE INVENTION

The present invention provides a robust, adaptive appearance model that simultaneously utilizes two or more model components (i.e., one or more stable components, and one or more transient components) that collect image data over two or more time scales to facilitate motion-based tracking of complex natural objects.

The stable component models relatively stable image data (i.e., image data that varies little over a relatively large number of image frames preceding a most recently received frame). By incorporating the stable component, the appearance model of the present invention is able to adapt to slowly developing appearance changes while maintaining a natural measure of the stability of the observed image structure. That is, the stable component facilitates highly reliable identification of an image structure by weighting stable image structure properties more heavily for motion estimation than unstable properties, which are proportionally downweighted.

In contrast to the stable component, the transient component models image data from a relatively small number of image frames preceding the most recently received frame. By incorporating the transient component, the appearance model is able to locate a target object that is subject to occlusions, significant image deformations, and natural appearance changes like those occurring with facial expressions and clothing. That is, when portions of the image structure become suddenly unstable, the influence of the transient components on the tracking process is upweighted to maintain target contact until stability is re-established.

By combining both the stable model component and the transient model component to identify a target object, the present invention provides a robust and adaptive appearance model that facilitates tracking and accurate image alignment for a variety of possible applications, such as localized feature tracking, and tracking models for which relative alignment and position is important, such as limbs of a human body.

In accordance with another aspect of the present invention, each piece of image data (e.g., data representing the relative brightness of an associated display pixel or group of pixels) is collectively represented by both the stable component and the transient component. In other words, each stable component and transient component includes a contribution parameter (e.g., a mixing probability) indicating a percentage of an associated data value represented by the associated component. For example, a given piece of image data is represented the stable component in an amount indicated by a contribution parameter, and is also represented in the transient component by a corresponding contribution parameter. The sum of the contribution parameters of all components making up the appearance model is equal to one (i.e., one hundred percent). These contribution parameters indicate a measure of confidence that the given data value is descriptive of the target object. For example, if a data value remains stable for a long period of time, then contribution parameter associated with the stable component will be relatively high relative to that of the transient component. In contrast, if the data value changes abruptly or varies rapidly, the percentages represented by the transient contribution parameter will typically increase, and the percentage represented by the stable contribution parameter will correspondingly decrease.

In accordance with yet another aspect of the present invention, stable component includes one or more stable data parameters that are utilized to determine how well a new datum compares with previously received image data. As mentioned above, the stable component stores a digital representation of a target image based on a relatively large number of image frames. Accordingly, in the embodiments described below, the stable data parameter is represented using statistical methods as mean $\mu_S$ and standard deviation $\sigma_S$ parameters that are calculated using data values received over a predetermined number (e.g., fifteen) of image frames preceding the currently received image frame, provided the data values used in the calculation fall within a predefined range of the mean (i.e., outliers are excluded). Alternatively, the stable data parameter may be calculated using any alternative method, such as an average of selected (e.g., every third) data value. As described in additional detail below, the stable data parameter is compared with each new datum, and the resulting comparison is utilized to update the various contribution parameters. That is, as mentioned above, when the stable data parameter is identical to a new datum, then the new datum indicates relative stability of the image data, and the stable contribution parameter tends to increase (or maintain a maximum value). Conversely, when the new datum is significantly different from the stable data parameter, the stable contribution tends to decrease, resulting in a proportional increase in the transient contribution parameter.

In accordance with a disclosed embodiment, a tracking system is described that incorporates the appearance model of the present invention. Image data is passed to a filter/processor, which filters and/or processes the image data according to established techniques to, for example, remove noise or other unnecessary data. In one exemplary embodiment, this filtering process is performed using wavelet-based filtering techniques that modify the image data in a manner suitable for subsequent tracking operations. The filtered/processed image data (or raw data, if no filter/processor is used) is then passed to a motion estimator, which also receives the existing image description stored by the appearance model. The motion estimator determines the location of the target object in the current image frame using the appearance model and a motion history associated with the target object. Upon determining the location of the target object in the image frame, an image warping tool is utilized to modify appearance model (or the new image datum) to account for motion-based deformations (e.g., size and/or axial rotation). After warping is performed, the image description provided in the appearance model is passed to a model updating tool, which updates the appearance model in accordance with the methods described herein. The updated appearance model parameters are then utilized to process a subsequently-received data frame.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

BRIEF DESCRIPTION OF THE DRAWINGS

FIGS. 4(A) and 4(B) are diagrams illustrating image data and associated appearance model mixing parameters;

FIG. 5 is a table listing a series of time values and associated image data values;

FIGS. 6(A), 6(B), and 6(C) are diagrams depicting appearance model component parameters generated in response to a relatively stable initial period;

FIG. 7 is a diagram depicting appearance model component parameters generated in response to a brief occlusion;

FIGS. 10(A), 10(B), and 10(C) are images depicting the tracking of a turning 3D target object;

FIGS. 11(A) and 11(B) are mixing probabilities and mean image data values associated with the image of FIG. 10(A);

FIGS. 12(A) and 12(B) are mixing probabilities and mean image data values associated with the image of FIG. 10(B);

FIGS. 13(A) and 13(B) are mixing probabilities and mean image data values associated with the image of FIG. 10(C);

FIG. 17(A) is a photograph including image data associated with the target object of FIG. 15(A) after a relatively long period of occlusion;

FIGS. 17(B), 17(C), and 17(D) are diagrams depicting mixing probability, mean data value, and ownership data associated with the image data shown in FIG. 17(A);

FIG. 18(A) is a photograph including image data associated with the target object of it FIG. 15(A) after the occlusion is cleared;

FIGS. 18(B), 18(C), and 18(D) are diagrams depicting mixing probability, mean data value, and ownership data associated with the image data shown in FIG. 18(A);

FIGS. 19(A), 19(B), and 19(C) are images depicting the tracking of subject exhibiting a natural distortion;

FIGS. 20(A) and 20(B) are mixing probabilities and mean image data values associated with the image of FIG. 19(A);

FIGS. 21(A) and 21(B) are mixing probabilities and mean image data values associated with the image of FIG. 19(B); and FIGS. 22(A) and 22(B) are mixing probabilities and mean image data values associated with the image of FIG. 19(C).

DETAILED DESCRIPTION OF THE DRAWINGS

The present invention is directed to an appearance model that is generated and updated by a computer or workstation, and is defined by parameters that are stored in one or more memory devices that are readable by the computer/workstation. Operation of the appearance model is described below in conjunction with a tracking system to illustrate how the beneficial features of the present invention facilitate motion-based tracking of complex natural objects. However, although described in the context of a tracking system, the appearance model of the present invention is not limited to this function, and may be utilized for other purposes. For example, the appearance model may be utilized to generate a dynamic image signature that can be used to identify complex natural objects (e.g., human beings). Therefore, the appended claims should not be construed as limiting the appearance model of the present invention to tracking systems or motion estimation applications unless such limitations are specifically recited.

Figure 1:
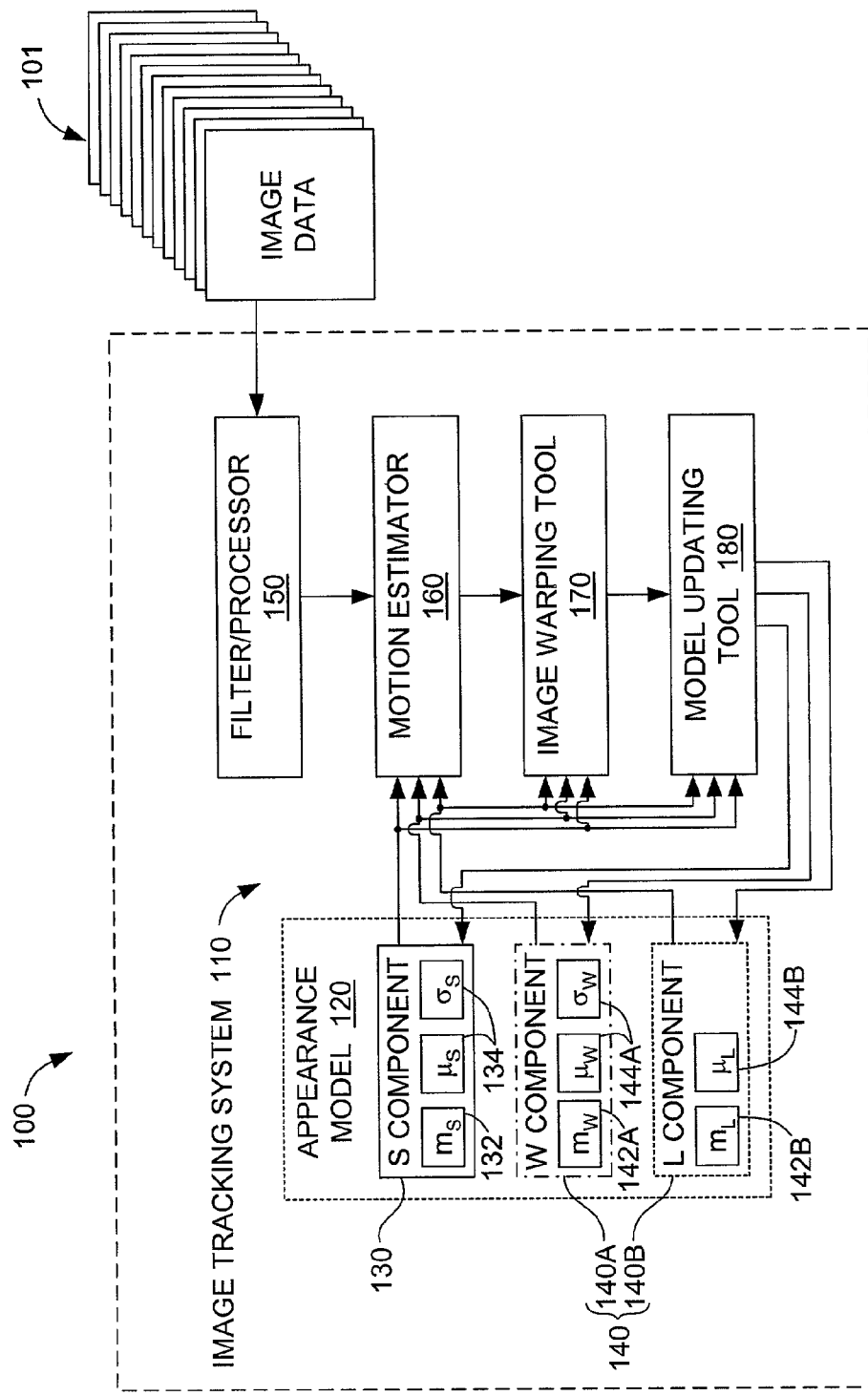
FIG. 1 is a block diagram illustrating a tracking system including an appearance model in accordance with an embodiment of the present invention.

FIG. 1 is a simplified block diagram showing a computer 100 configured to implement an image tracking system 110 that utilizes an appearance model 120 to track a selected target object appearing in a series of temporally sequential image data frames 101, which are suitably digitized and input into computer 100 using conventional methods. Tracking system 110 also includes several software subsystems (tools) including an optional filter/processor subsystem 150 that yields one or more data streams associated with the array of image pixel data representing a current image frame, a motion estimator 160, an image warping tool 170, and an appearance model updating tool 180. The individual functions performed by these subsystems are described below. These subsystems cooperate to execute the tracking function and to update appearance model 120 in the manner described in additional detail below. Note that the separate subsystem blocks indicated in FIG. 1 are provided for descriptive purposes only, and that at least some functions performed by some of these subsystems may be integrated into other subsystems using known techniques.

In accordance with an embodiment of the present invention, appearance model 120 includes, for one or more data streams, a stable (S) component 130 and one or more transitory components 140 (e.g., a "wandering" (W) component 140A and/or a lost (L) component 140B) that collectively define an online digital representation of the selected target object. The term "online" is utilized herein to mean that the digital representation of the selected target object is incrementally updated using datum from a current (i.e., most-recent) image frame. In particular, after establishing a digital representation of the target object (as defined by the parameters of stable component 130 and transient component 140) using data received in an initial series of image frames, an established digital representation is compared with corresponding data from a new image frame, and then the established digital representation is updated (changed) according to differences between the previously-established digital representation and the new data, thereby generating an incremental "new" established digital representation. Accordingly, the digital representation is "online" in the sense that it is defined both by previously received data from one or more image frames, and new data from a current image frame.

In general, stable component 130 differs from transient component 140 in that the digital representation component defined by stable component 130 is based on a longer temporal history (i.e., longer time scale) than that of transient component 140. That is, the parameters of stable component 130 reflect the "stability" of image data in each incrementally established digital representation. The terms "stability" and "stable" are used herein to describe image data values that remain relatively unchanged over a relatively long time scale (e.g., over five or more sequential image frames). In contrast, the parameters of transient component 140 reflect the relative transience of image data in each incrementally established digital representation. Thus, the term "transient" is used herein to describe image data values that are unstable (e.g., outliers), or image data that has been stable for only a relatively short time scale (e.g., less than five sequential image frames). For example, in the exemplary embodiment provided below, W component 140A operates in a manner similar to a conventional 2-frame motion estimator in that its parameters are calculated using only a current image frame and the image frame immediately preceding the current image frame. In alternative embodiments, W component 140A may be modified to compare data from a small number (e.g., two or three) of frames preceding the current frame. Alternatively, as described in the exemplary embodiment provided below, L component 140B is utilized to store outlier data, and is therefore updated using data from only one image frame (i.e., the current frame).

In accordance with another aspect of the present invention, each piece of image data from a selected data stream (e.g., data representing the relative brightness of an associated display pixel or filter output) is collectively represented by both stable component 130 and transient component 140. In other words, each stable component 130 and transient component 140 includes a contribution parameter (e.g., a mixing probability) indicating a percentage of an associated data value represented by the associated component. For example, a given piece of image data is represented the stable component 130 in an amount indicated by a contribution parameter 132, and is also represented in the transient component 140 by corresponding contribution parameters 142A and 142B (associated with W component 140A and L component 140B, respectively). The sum of contribution parameters 132, 142A, and 142B of all components making up appearance model 120 is equal to one (i.e., one hundred percent). These contribution parameters indicate a measure of confidence that the given data value is descriptive of the target object. For example, as described in detail below, if a data value remains stable for a long period of time, then contribution parameter 132 will be relatively high relative to transient contribution parameters 142A and 142B. In contrast, if the data value changes abruptly or varies rapidly, the percentages represented by transient contribution parameters 142A and 142B will typically increase, and the percentage represented by stable contribution parameter 132 will correspondingly decrease.

In accordance with yet another aspect of the present invention, stable component 130 includes one or more stable data parameters 134 that are utilized to determine how well a new datum compares with previously received image data. As mentioned above, stable component 130 stores a digital representation of a target image based on a relatively large number of image frames. Accordingly, in the embodiments described below, stable data parameter 134 is represented using statistical methods as mean $\mu_s$ and standard deviation $\sigma_s$ parameters that are calculated using data values received over a predetermined number (e.g., fifteen) of image frames preceding the currently received image frame, provided the data values used in the calculation fall within a predefined range of the mean (i.e., outliers are excluded). Alternatively, stable data parameter 134 may be calculated using any alternative method, such as an average of selected (e.g., every third) data value. As described in additional detail below, stable data parameter 134 is compared with each new datum, and the resulting comparison is utilized to update contribution parameters 132, 142A, and 142B. That is, as mentioned above, when stable data parameter 134 is identical to a new datum, then the new datum indicates relative stability, and stable contribution parameter 132 tends to increase (or maintain a maximum value). Conversely, when the new datum is significantly different from stable data parameter 134, stable contribution 132 tends to decrease, resulting in a proportional increase in one or both transient contribution parameters 142A and 142B.

In accordance with yet another aspect of the present invention, transient component 140 includes one or more transient data parameters 144A and 144B that are optionally utilized to further determine how well a new datum compares with previously received image data. For example, when utilized in appearance model 120, component 140A includes mean $\mu_W$ and standard deviation $\sigma_W$ parameters that are calculated over a relatively small number of frames. Alternatively, as utilized in the exemplary embodiment described below, the "mean" is simply the previously received data value, and the "standard deviation" is a predefined fixed range. Note that for L component 140B, which is described in additional detail below, a "mean" parameter $\mu_L$ may be utilized or omitted.

Referring again to FIG. 1, tracking system 110 generally operates as follows. Image data 101 is passed to a filter/processor 150, which filters and/or processes the image data according to established techniques to, for example, remove noise or other unnecessary data. In the exemplary embodiment described below, this filtering process is performed using wavelet-based filtering techniques that modify the image data in a manner suitable for subsequent tracking operations. The filtered/processed image data (or raw data, if no filter/processor is used) is then passed to a motion estimator 160, which also receives the existing image description stored by appearance model 120. Motion estimator 160 determines the location of the target object in the current image frame using appearance model 120 and a motion history associated with the target object, which is generated by motion estimator 160 in accordance with established techniques. Upon determining the location of the target object in the image frame, an image warping tool 170 is utilized to modify appearance model 120 (or the new image datum) to account for motion-based deformations (e.g., size and/or axial rotation). After warping is performed, the image description provided in appearance model 120 is passed to a model updating tool 180, which updates appearance model 120 in accordance with the methods described herein. The updated appearance model parameters are then utilized to process a subsequently-received data frame.

Figure 2:
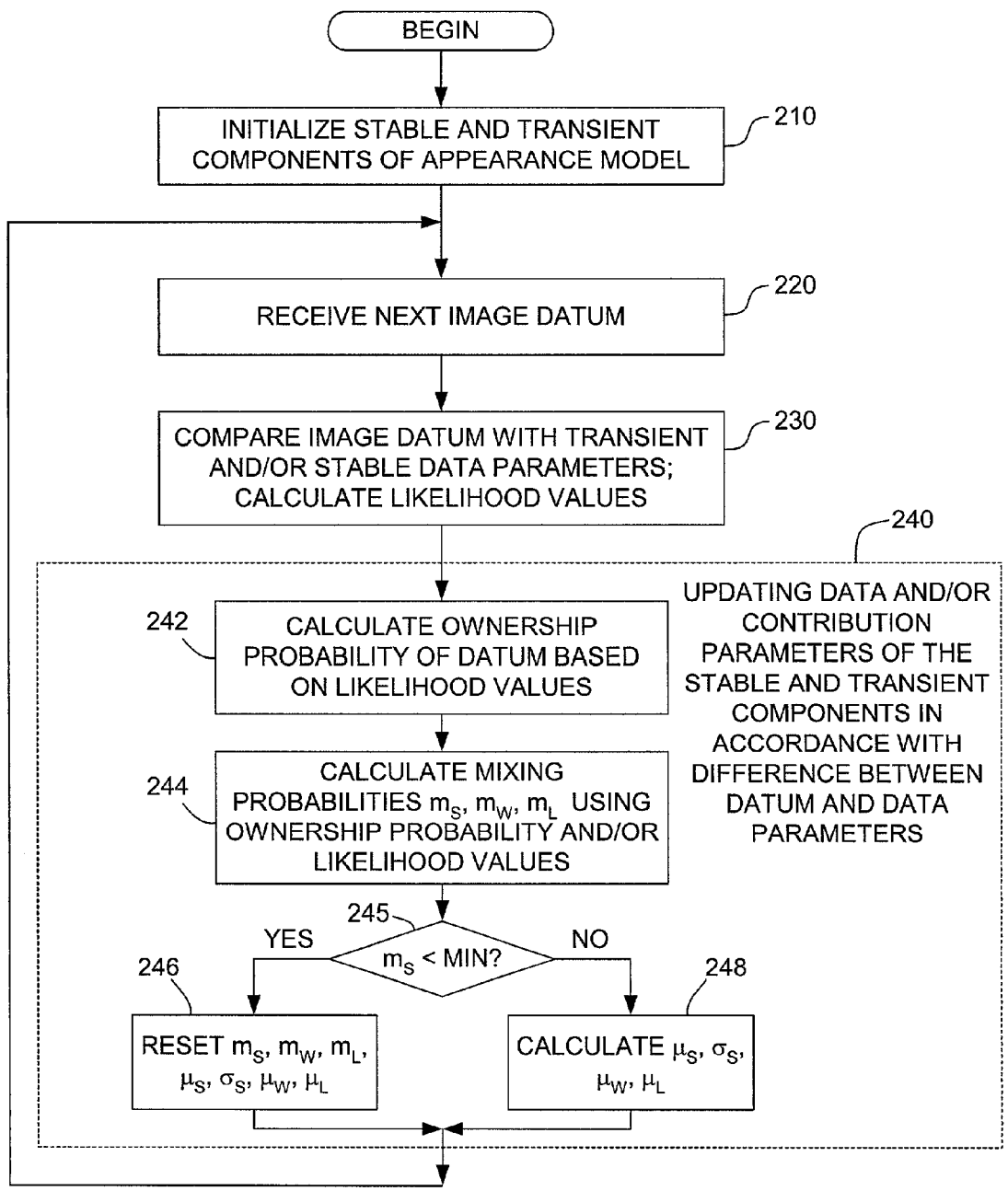
FIG. 2 is a flowchart illustrating the general operation of the appearance model utilized in the tracking system of FIG. 1.

FIG. 2 is a simplified flow diagram illustrating a general process used to generate and update appearance model 120 (FIG. 1) in accordance with an embodiment of the present invention. The simplified flow diagram assumes a single data point is processed during each iteration, and omits functions associated with tracking (e.g., motion estimation and image warping). A more detailed description of the illustrated process is provided below.

Referring to the upper portion of FIG. 2, the process begins by initializing the parameters of the stable and transient components (block 210). For example referring to FIG. 1, stable contribution component 132 and stable data component 134 of stable component 130 may be set to a predetermined value. Note that the predetermined value for contribution component 132 is utilized in the event of a reset operation (described below).

Referring again to FIG. 2, after initialization, an image datum is received (block 220) in the manner described above, and then the image datum is compared with the established component parameters (block 230). In accordance with an embodiment of the present invention, during this comparison a log-likelihood ("likelihood") value is calculated for each component based on a difference between the datum and the existing data parameter(s) according to known statistical methods. This likelihood value indicates how well the datum matches with the established data parameters. For example, assume stable data parameters including a mean $\mu_S$ of 14 and a standard deviation of 2. If the datum is equal to 14, then the calculated likelihood value will be maximized for the stable component. Conversely, if the datum is equal to 24, the likelihood value will be relatively very low. A likelihood value is calculated in a similar manner for the W component (if used), but may be omitted for the L component (if used).

The results of the comparison between the datum and established data parameters are then used to update the contribution parameters (referred to below as mixing probabilities) and to generate new data parameters for each of the appearance model components (block 240). In one embodiment, this process involves the optional step of calculating ownership values for each component using the likelihood values (block 242), which is described in additional detail below. Next (or alternatively), new mixing probabilities are calculated for each component using the ownership probabilities and/or the likelihood values (block 244). The newly calculated stable contribution value (e.g., $m_S$) is then compared against a predefined minimum value (block 245). If the newly calculated stable contribution value is less than the predefined minimum value (YES), then all of the component parameters are reset to predefined values (block 246). Conversely, if the newly calculated stable contribution value is greater than the predefined minimum value (NO in block 245), then the data parameters of each component are updated to reflect the new datum (block 248).

The above sequence is then repeated for each new datum associated with each new data stream. Note that the component parameter updating process (block 240) may be altered to place the minimum value determination (block 245) after the recalculation of data parameters (block 248) without detracting from the ultimate outcome.

While a novel and beneficial appearance model is generated utilizing the stable component and at least one of the transient components in combination with the process described with reference to FIG. 2, a presently preferred embodiment of the present invention includes an appearance model incorporating all of the stable (S) component 130, the wandering (W) component 140A, and the lost (L) component 140B (see FIG. 1) in accordance with the following description. Such an appearance model is referred to herein as a "WSL appearance model".

The WSL appearance model of the present invention is introduced below with reference to a single real-valued data observation. After describing the operation of the WSL appearance model with reference to a signal data value, the description will shift to address the treatment of entire data frames.

Figure 3A:
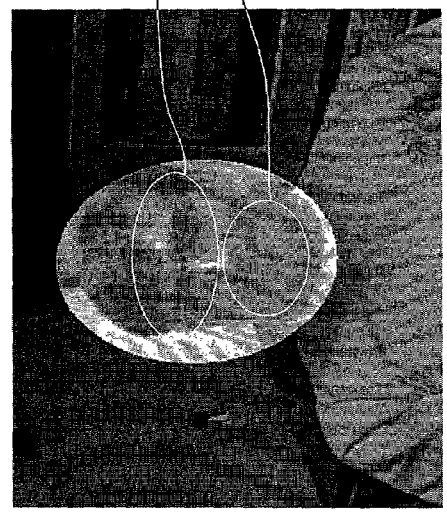
FIGS. 3(A), 3(B), 3(C), and 3(D) are photographs depicting several image distortions addressed by the appearance model.
Figure 3B:
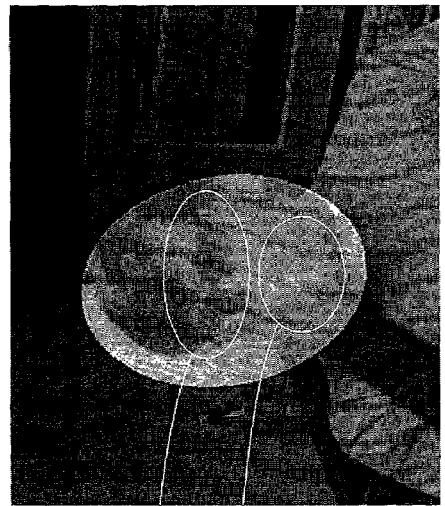
Figure 3C:
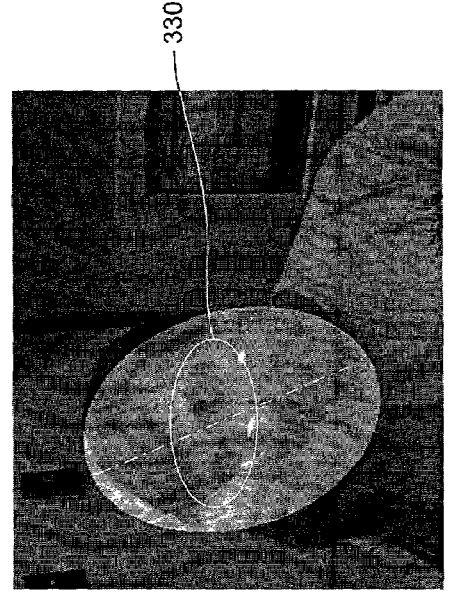
Figure 3D:
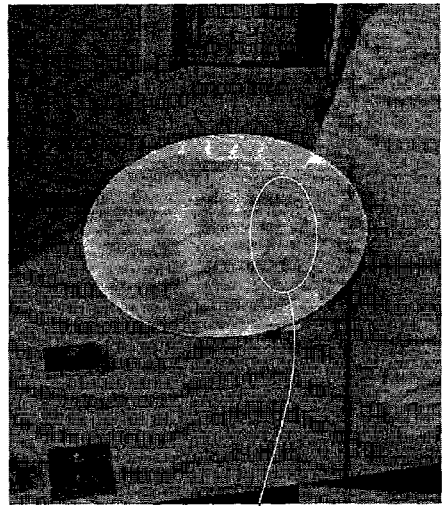

FIGS. 3(A) through 3(D) represent an interrupted sequence of image data frames showing a face as a tracking region (target object) using a simple parametric motion model, and depict typical image distorting phenomena that must be accounted for by the WSL appearance model. FIG. 3(A) depicts an initial, relatively stable period during which the WSL appearance model is allowed to stabilize. Note that regions of high contrast, such as forehead region 310 and mouth region 320, tend to generate highly stable image data. FIG. 3(B) illustrates a partial occlusion during which the subject's hand is briefly positioned over mouth region 320, but forehead region 310 remains relatively undistorted. FIG. 3(C) depicts a significant appearance discontinuity causing a restart (i.e., a sudden, jerking head movement during which the subject's head is tilted and moved quickly away from the camera and glasses are removed from eye region 330). Finally, FIG. 3(D) depicts a changing facial expression as an example of a natural distortion. In particular, as indicated in region 340, it is assumed that the subject smiles broadly without any other significant movement (contrast mouth region 310 in FIG. 3(A)).

The phenomena depicted in FIGS. 3(A) through 3(D) motivate the various component data parameters of the WSL appearance model. The relatively stable image depicted in FIG. 3(A) motivates the S component, which is intended to capture the behavior of temporally stable image observations when and where they occur. In particular, assuming $d_t$ represents a data value at each frame t, given that the stable component generated the observation $d_t$, the probability density for $d_t$ is modeled by the Gaussian density $p_s(d_t|\mu_{s,t},$ $\sigma^2_{s,t}$). Here $\mu_{s,t}$ and $\sigma^2_{s,t}$ are piecewise, slowly varying functions specifying the mean and variance of the Gaussian model.

The second component of the WSL appearance model accounts for data outliers, which are expected to arise due to failures in tracking, or occlusion. As discussed above, the corresponding random process is referred to herein as the "lost", or L component of the WSL appearance model. The probability density for the L component, denoted by $p_l(d_t)$, is taken to be a uniform distribution over the observation domain.

The synthetic signal depicted in FIG. 4(A) provides an idealized example of these generative processes for a single data stream. The dashed line represents the piecewise slowly varying appearance signal AS. The observed data OD has been corrupted by long-tailed noise formed from a mixture of the Gaussian density $p_s(d_t|\mu_{s,t}, \sigma^2_{s,t})$ and the broad distribution $p_l(d_t)$ for the L component. The solid dark line depicts an estimated mean EM for the S component. In accordance with the discussion above, the sequence of image data frames is initiated at region 400, and then enters a relatively stable phase (region 410) associated with FIG. 3(A). Region 420 of the synthetic signal indicates a burst of outliers between frames 300 and 315 analogous to the occlusion of FIG. 3(B). Region 430 indicates a restart at frame 600 analogous to the appearance discontinuity of FIG. 3(C). Finally, region 440 indicates localized signal distortions produced by the changing facial expression of FIG. 3(D).

The W component of the WSL appearance model is motivated by the desire to integrate the appearance model with an image-based tracking algorithm. That is, for a selected image region, the goal is to learn a model for the dominant stable image structure within the region, and to simultaneously track it. This is difficult when an initial stable appearance model is not provided, nor information regarding how the object moves. The W component determines what should be tracked in such a situation. As mentioned above, in effect, the W component permits a tracking system (described below) to gracefully degrade to a 2-frame motion tracker when the appearance model does not account for enough past data observations.

The W component needs to allow both for more rapid temporal variations and shorter temporal histories than are required for the reliable estimation of the S component parameters. As such, the probability density for $d_t$ is chosen, given that it is generated by the W component, to be the Gaussian density $p_w(d_t|d_{t-1})$. Here the mean is simply the observation from the previous frame, $d_{t-1}$, and the variance is fixed at $\sigma^2_w$.

The three components, W, S, and L, are combined in a probabilistic mixture model for $d_t$, $$p(d_t|q_t, m_t, d_{t-1}) = m_w p_w(d_t|d_{t-1}) + m_s p_s(d_t|q_t) + m_l p_l(d_t) \quad \text{EQUATION (1)}$$

where $m = (m_w, m_s, m_l)$ are the mixing probabilities, and $q_t = (\mu_{s,t}, \sigma^2_{s,t})$ contains the mean and variance parameters of the stable component of the model.

To implement the WSL appearance model in a conventional tracking system, it is necessary to estimate the parameters of the generative model in (1), namely, the mean and variance of the prediction of the data, $d_t$, by the stable process, $q = (\mu_s, \sigma^2_s)$, and the mixing probabilities $m = (m_w, m_s, m_l)$. Moreover, to apply the estimation scheme to filter responses, a simple computational algorithm is sought that requires a relatively small amount of memory for each observation.

Anticipating a recursive formulation, and allowing for temporal adaptation of the model parameters, we consider data observations under an exponential envelope located at the current time, $S_t(k) = \alpha e^{-(t-k)/\tau}$, for $k \leq t$. Here, $\tau = \eta_{s/\log 2}$, where $\eta_s$ is the half-life of the envelope in frames, and $\alpha = 1 - e^{-1/\tau}$ so the envelope weights $S_t(k)$ sum to 1. With this envelope the log-likelihood of the observation history, $$d_t = \{d_k\}_{k=0}^t$$

is expressed according to the density in (1):

$$L(d_t | m_t, q_t) = \sum_{k=t}^{-\infty} S_t(k) \log p(d_k | m_t, q_t, d_{k-1}) \quad \text{EQUATION (2)}$$

where $m_t$ and $q_t$ denote parameters relevant to the data under the temporal support envelope $S_t(k)$. Although these parameters change slowly through time, an EM-algorithm (see, for example, A. P. Dempster, N. M. Laird, and D. B. Rubin, "Maximum Likelihood from Incomplete Data Via the EM Algorithm", *J. Royal Statistical Society Series B*, 39:1–38, 1977) is considered for estimating $m_t$ and $q_t$ that assumes they are constant under the temporal window. The form of these EM-updates provides the basis for the on-line method described herein.

Given a current guess for the state variables $m_t$ and $q_t$ (constant over the temporal window), the E-step provides the ownership probabilities for each observation $d_k$:

$$o_{i,t}(d_k) = \frac{m_{i,t} p_i(d_k; q_i, d_{t-1})}{p(d_k; m_t, q_t, d_{k-1})} \quad \text{EQUATION (3)}$$

for $i \in \{w, s, l\}$. Conditioned on these ownerships, the M-step then computes new maximum likelihood estimates for the parameters $m_t$ and $q_t$. First, the updated mixture probabilities, $m_t$, are given by $$m_{i,t} = \sum_{k=t}^{-\infty} S_t(k) o_{i,t}(d_k) \quad \text{EQUATION (4)}$$

for $i \in \{w, s, l\}$ (the notation $m_{i,t}$ is reused to denote the updated values). Similarly, the M-step for the mean and variance are $$\mu_{s,t} = \frac{M_{1,t}}{M_{0,t}}, \quad \sigma^2_{s,t} = \frac{M_{2,t}}{M_{0,t}} - \mu^2_{s,t} \quad \text{EQUATION (5)}$$

where $M_{j,t}$ are the ownership weighted, $j^{th}$-order data moments defined by $$M_{j,t} = \sum_{k=t}^{-\infty} S_t(k) d_k^j o_{s,t}(d_k) \quad \text{EQUATION (6)}$$

It is worth noting here that the zeroth data moment, the time averaged ownerships of the stable process, is precisely the mixing proportion for the S component of the WSL appearance model, $M_{o,t} = M_{s,t}$. The standard EM-algorithm then consists of iterating the steps outlined in Equations (3)–(6).

This EM-algorithm requires that the data from previous times be retained to compute $o_{s,t}(d_k)$, which is impractical for an on-line approach. Instead an approximation to Equations (3)–(6) is adopted. To this end, a recursive expression for the exponential support $S_t$ (k) is exploited to obtain $$M_{j,t} = S_t(t) d_t^j o_{s,t}(d_t) + \sum_{k=t-1}^{-\infty} S_t(k) d_k^j o_{s,t}(d_k) \quad \text{EQUATION (7A)}$$

$$M_{j,t} = \alpha d_t^j o_{s,t}(d_t) + (1-\alpha) \sum_{k=t-1}^{-\infty} S_{t-1}(k) d_k^j o_{s,t}(d_k) \quad \text{EQUATION (7B)}$$

In order to avoid having to retain past data, the current ownership of past data is approximated by the ownerships at the times the data were first observed. That is, $o_{s,t}(d_k)$ is replaced by $o_{s,k}(d_k)$ to obtain the approximate moments $$\hat{M}_{j,t} = \alpha d_t^j o_{s,t}(d_t) + (1-\alpha) \sum_{k=t-1}^{-\infty} S_{t-1}(k) d_k^j o_{s,k}(d_k) \quad \text{EQUATION (8A)}$$

$$\hat{M}_{j,t} = \alpha d_t^j o_{s,t}(d_t) + (1-\alpha) \hat{M}_{j,t-1} \quad \text{EQUATION (8B)}$$

Also, the mixing probabilities are approximated the same way:

$$\hat{m}_{i,t} = \alpha o_{i,t}(d_t) + (1-\alpha) \hat{m}_{i,t-1} \quad \text{EQUATION (9)}$$

for $i \in \{s, w, l\}$. One further deviation from these equations is used to avoid singular situations; i.e., a non-zero lower bound is imposed on the mixing probabilities and $\sigma_{s,t}$.

In this approximation to the batch EM in Equations (3)–(6), as mentioned above, the data ownerships of the past observations are not updated. Therefore, when the model parameters change rapidly, this on-line approximation is poor. Fortunately, this typically occurs when the data are not stable, which usually results in a low mixing probability and a broad variance for the S component in any case. Conversely, when the mean and variance drift slowly, the on-line approximation is typically very good (see FIG. 4(A).

Given sudden changes in appearance, or unstable data, the S component often loses track of the mean, and is given a small mixing probability (see FIG. 4(B), discussed below). Thus it is necessary to occasionally restart the appearance model. Here the WSL appearance model is restarted whenever the stable mixing probability $m_{s,t}$ falls below a fixed threshold (e.g., 0.1). This is done by simply resetting the values of all state variables. In one embodiment, the new values used for the mixing probabilities $m_{i,t}$ are 0.4, 0.15, and 0.45 for i=w, s, l. The small value for $m_{s,t}$ reflects an initial uncertainty for the S component. The new values for the moments $M_{j,t}$ for j=0,1,2 are taken to be $m_{s,t}$, $d_t m_{s,t}$ and $\sigma^2_{s,0} m_{s,t}$, respectively. In effect this restarts the S component with a mean given by the current observation $d_t$, and a variance given by the constant $\sigma^2_{s,0}$. Here $\sigma_{s,0} = \sigma_w/1.5$ is used. These same values are used for initialization in the first frame.

FIG. 4(B) illustrates the EM procedure with reference to the 1D example of FIG. 4(A) using a half-life $n_{s=8}$. At the startup period indicated in region 405 (corresponding to region 400 of FIG. 4(A)), each of the W, S, and L components assume their predetermined reset values. Initially, the mixing probability of the W component increases from the reset values, indicating a proportionally greater ownership of the data until the S component gains confidence, as indicated in region 415 (corresponding to region 410 of FIG. 4(A)). Region 425 indicates that, during the outlier burst at frame 300 (corresponding to region 420 of FIG. 4(A)), the mixing probability of the L component increases, then drops back as stability returns. Note that the occlusion was insufficient to prompt a restart due to unoccluded stable image data (e.g., region 310 in FIG. 3(B)). Region 435 illustrates a response to the appearance discontinuity at frame 600 (corresponding to region 430 of FIG. 4(A)), where the S component is a poor predictor for the data, and its mixing probability drops quickly. Note that, because the W component can explain the data, its mixing probability increases. At frame 625 the mixing probability of the S component drops sufficiently low that the procedure restarts, after which the S component locks back onto the true state.

FIGS. 5 through 9(B) illustrate the effects of various data changes on the WSL appearance model of the present invention using another simplified example. FIG. 5 indicates sequential data that describe the brightness (grayscale) of a selected pixel during a time sequence extending between times $t_0$ and $t_{16}$. Note that the period between each indicated time point may or may not be uniform. A relatively stable initial stage is provided between times $t_0$ and $t_5$ during which the appearance model is allowed to stabilize, similar to that described above with reference to FIG. 3(A). A brief occlusion is introduced at time $t_6$, similar to the occlusion discussed with reference to FIG. 3(B), which is characterized by a relatively rapid and significant, but brief, change of the image data from a first stable value (e.g., 12) to a second stable value (e.g., 24), and then back to the first stable value. A gradual brightness change is indicated between times $t_7$ and $t_{11}$, during which period the image data changes relatively slowly and over a relatively small range (e.g., from 12 to 14). Finally, an appearance discontinuity is indicated at time $t_{12}$, which is characterized by a relatively rapid, significant, and relatively permanent change of the image data from a first stable value (e.g., 14) to a second stable value (e.g., 24).

FIGS. 6(A), 6(B), and 6(C) are graphs depicting adjustments to the S component, W component, and L component during the initial stable time period between times $t_0$ and $t_5$, respectively. At reset (time $t_0$), the contribution parameters (i.e., the mixing probabilities, which are indicated by the vertical scale of each graph) adopt predetermined reset values. These values are depicted by the vertical location of each component at time $t_0$. For example, referring to FIG. 6(A), component $S(t_0)$ is located at the lower portion of the graph and is aligned with the reset value 0.15. Similarly, referring to FIGS. 6(B) and 6(C), components $W(t_0)$ and $L(t_0)$ are aligned with reset values 0.4 and 0.45, respectively. Note again that these reset values may be changed. Subsequent to time $t_0$, because the data remains stable, the contribution parameter for the S component gradually increases to a maximal (apex) value of 0.85 at time $t_5$. This maximal value is selected solely for explanatory purposes. In addition, the consistent data value 12 over this time period produces a stable mean parameter Us that remains centered on 12, while the standard deviation decreases (depicted by a gradual narrowing of the bar separating standard deviation parameters $+\sigma_S$ and $-\sigma_S$). Referring to FIGS. 6(B) and 6(C), while the S component rises to this maximal value, the W component and L component compete for the remaining ownership portion of the data. In the disclosed example, because the data value remains stable, the contribution value of the W component increases faster than that of the L component, which gradually decreases as consistent data values are received. The initial increase of the W component from its reset value to a maximum value (indicated by component $W(t_1)$), and then recedes to a minimum value (e.g., 0.15) as the S model gains confidence and reaches its maximum value. Note that, assuming a relatively long stable period, the L component recedes to a very small number, but never zero.

Referring to FIG. 7, the brief occlusion at time $t_1$, which is indicated as a jump in data value from 12 to 24, causes a reduction in the contribution parameters for both the S component and the W component. In particular, because the data value (i.e., 24) is outside of the variance for both the S component and the W component, the data is treated as an outlier, and ownership of the data value is predominantly assigned to the L component. Accordingly, as indicated on the right side of FIG. 7, component $L(t_5)$ is assigned a somewhat larger contribution parameter of, for example, 0.35. This increased ownership by the L component causes a reduction in the contribution parameters of the S and W components, which are indicated by $S(t_5)$ and $W(t_5)$, respectively. In the disclosed embodiment, because the data value at time $t_5$ is considered an outlier, it is not used to recalculate the mean and variance of the S component. Therefore, mean value $\mu_{S(t5)}$ remains centered on data value 12, and the variance is not changed from that of $S(t_4)$ (see FIG. 6(A)). After the occlusion is removed (time $t_6$), and stable data reappears, the S component again gains confidence, and its contribution parameter increases at the expense of the L component until its maximum value is again reached (time $t_7$). Also, note that the mean of the W component is determined by the previous data value, so mean $\mu_W$ also remains centered on 12 at time $t_5$, then shifts to 24 at time $t_6$, and then returns to 12 at time $t_7$.

Figure 8:
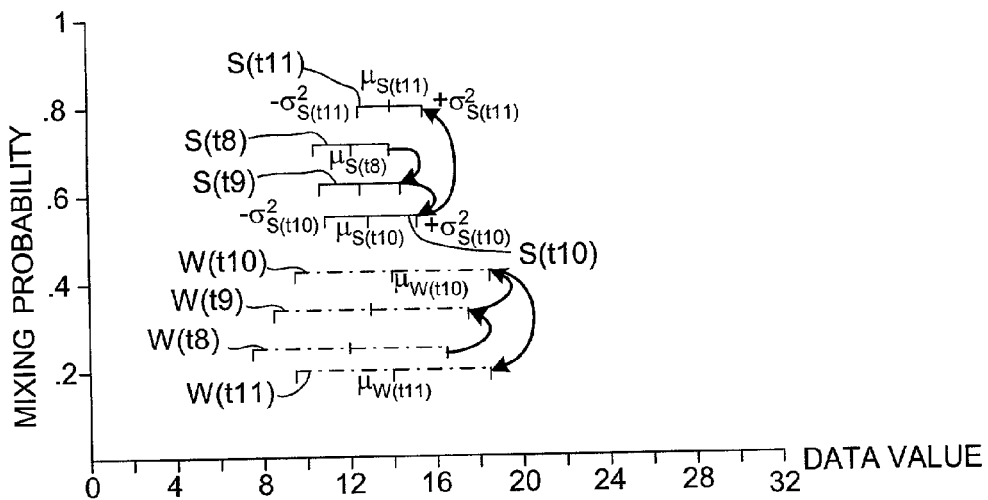
FIG. 8 is a diagram depicting appearance model component parameters generated in response to gradually changing image data.

As depicted in FIG. 8, in contrast to occlusion described with reference to FIG. 7, which does not change the data parameters of the S component, a gradual data change between times $t_6$ and $t_{11}$ results in a migration of the S component mean value, and an increase in the standard deviation. The example shown in FIG. 8 assumes that the contribution parameter of the S component is maximized, so even a small data value change will reduce the confidence of the S model, causing an associated reduction in the contribution parameter. If the contribution parameter is not maximized, then it may actually increase even though the new data value differs from the previously calculated mean. In this example, the data parameters (e.g., mean and standard deviation) of the S component are changed because the image data change between times $t_7$ and $t_8$ (i.e., from 12 to 13) is selected to be within the standard deviation of the S component. Accordingly, the image data change is not treated as an outlier, and is used in the calculation of a new mean value $\mu_{S(t8)}$, which is gradually shifted from 12 toward 14. Note that any reduction in the S component contribution parameter is accounted for by an increase in that of the W component, whose mean also migrates with the changing data values. Sometime after the image data re-stabilizes at 14 (e.g., time $t_{10}$), the S component's confidence returns, and the mean centers on the new stable value, as indicated by component $S(t_{11})$ Accordingly, the example shown in FIG. 8 illustrates how the S component of an appearance model generated in accordance with the present invention adapts to slowly changing image data, thereby facilitating the tracking of 3D objects.

Figure 9A:
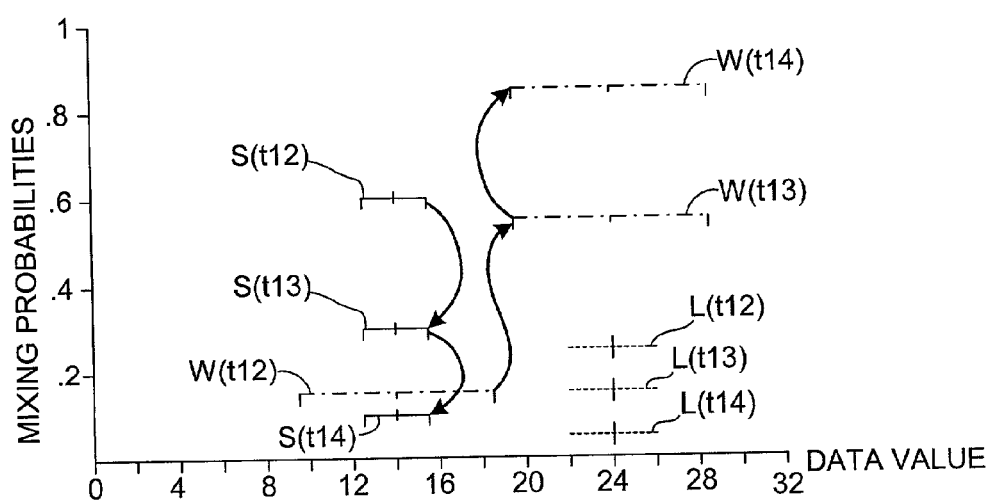
FIGS. 9(A) and 9(B) are diagrams depicting appearance model component parameters generated in response to a long term image distortion.
Figure 9B:
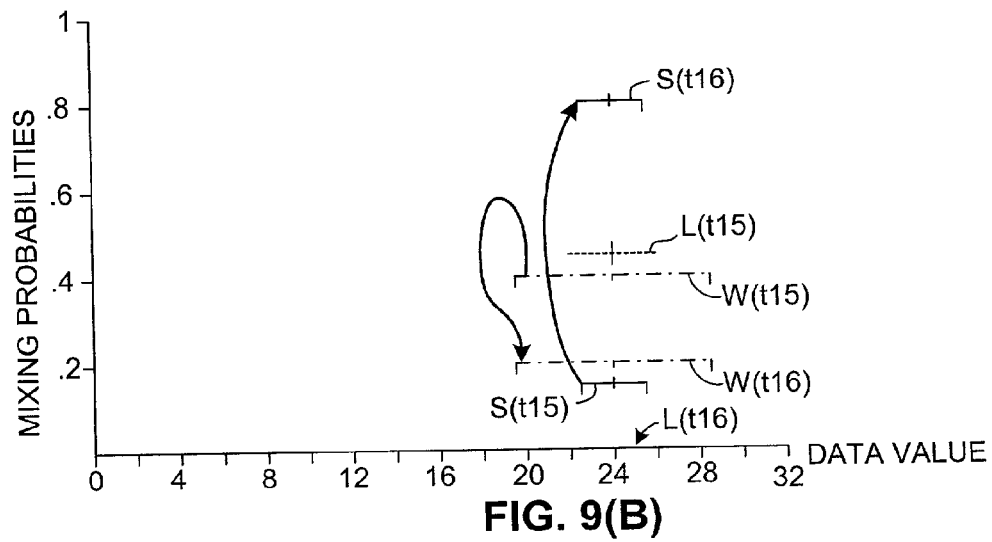

FIGS. 9(A) and 9(B) illustrate a final example in which the image data significantly changes from one stable value (e.g., 14 at time $t_{11}$) to another stable value (e.g., 24 at time $t_{12}$). As mentioned above and shown in FIG. 9(A), the sudden appearance of relatively large image data change causes a reduction in the contribution parameters of the W and S components, and a jump in the L component contribution. Note again that the new datum is not included in the calculation of the data parameters (mean and variance) for the S component. Because the data value stabilizes at 24, the S component's contribution parameter continues to drop, and the W component begins to increase (the L component decreases). Eventually, the S component's contribution parameter drops below a predetermined reset value (see Step 245, FIG. 2), thereby causing a restart at time $t_{15}$, which is shown in FIG. 9(B). Note that, at the restart, mean value $\mu_{S(t6)}$ is centered over the most recent data value (i.e., 24). Subsequent rebuilding of the appearance model is essentially identical to that described above with reference to FIGS. 6(A), 6(B), and 6(C).

Now that the various parameter responses of the WSL appearance model have been described with reference to a single data value, a derivation of the components used to implement the WSL appearance model in tracking system 110 (see FIG. 1) will now be described. In particular, as set forth below, the filtering/processing performed by filter/processor 150 is implemented using steerable pyramids, as described below. In addition, the motion estimation and image warping functions performed by motion estimator 160 and image warping tool 170 are discussed.

There are many properties of image appearance that one could use as data streams from which one could learn appearance models for tracking and object search. Examples include local color statistics, multiscale filter responses, and localized edge fragments. In this work, the data streams were derived from responses of a steerable filter pyramid is applied (i.e., based on the $G_2$ and $H_2$ filters; see W. Freeman and E. H. Adelson, "The Design and Use of Steerable Filters", *IEEE Transactions on Pattern Analysis and Machine Intelligence*, 13:891–906, 1991). Steerable pyramids provide a description of the image at different scales and orientations that is useful for coarse-to-fine differential motion estimation, and for isolating stability at different scales and at different spatial locations, and different image orientations. Here $G_2$ and $H_2$ filters are used at two scales, tuned to wavelengths of eight and sixteen pixels (sub-sampled by factors of two and four), with four orientations at each scale.

From the filter outputs, the present inventors chose to maintain a representation of the phase structure as the appearance model. This provides a natural degree of amplitude and illumination independence, and it provides the fidelity for accurate image alignment afforded by phase-based methods (see, for example, D. J. Fleet and A. D. Jepson, "Stability of Phase Information", *IEEE Transactions on PAMI*, 15(12):1253–1268, 1993). Phase responses associated with small filter amplitudes, or those deemed unstable according to the techniques described in the above-cited paper were treated as outliers.

In what follows, given an image pyramid and a target region $N_t$, let $d_t = \{d(x,t)\}_{x \in N_t}$ denote the set of phase observations from all filters at time t in the region. Let $A_t = \{m(x,t), q(x,t)\}_{x \in N_t}$ denote the entire appearance model of the phase at each orientation, scale, and spatial location in $N_t$. The half-life of the exponential temporal support, $S_t(k)$, was set to $n_s=20$ frames. The other parameters of the on-line EM estimator are: 1) the outlier probability, which is uniform on $[-\pi; \pi)$; 2) the standard deviation of the W component on phase differences, which is taken to be mean-zero Gaussian with $\sigma_w=0.35\pi$; and 3) the minimum standard deviation of the S component, $\sigma_{s,0}=0.1\pi$. These latter parameters are specific to the use of phase.

The present inventors will now demonstrate the behavior of the adaptive, phase-based appearance model in the context of tracking nonrigid objects. For this demonstration an elliptical region $N_o$ at time 0 is manually specified. The tracking algorithm then estimates the image motion and the appearance model as it tracks the dominant image structure in $N_t$ over time.

The motion is represented in terms of frame-to-frame parameterized image warps. In particular, given the warp parameters $c_t$, a pixel x at frame t−1 corresponds to the image location $x_t=w(x;c_t)$ at time t, where $w(x;c_t)$ is the warp function. Similarity transforms are used here, so $c_t=(u_t, \theta_t, \rho_t)$ is a 4-vector describing translation, rotation, and scale changes, respectively. Translations are specified in pixels, rotations in radians, and the scale parameter denotes a multiplicative factor, so $\vec{\eta} \equiv (0,0,0,1)$ is the identity warp. By way of tracking, the target neighborhood is convected (i.e. warped) forward at each frame by the motion parameters. That is, given the parameter vector $c_t$, $N_t$ is just the elliptical region provided by warping $N_{t-1}$ by $w(x;c_t)$. Other parameterized image warps, and other parameterized region representations could also be used (e.g., see F. G. Meyer and P. Bouthemy, "Region-Based Tracking Using Affine Motion Models in Long Image Sequences", *CVGIP: Image Understanding*, 60(2):119–140, 1994).

To find an optimal warp, the sum of the data log-likelihood and a log-prior is (locally) maximized to provide a preference for slow and smooth motions. In terms of the motion and appearance models outlined above, the data log-likelihood can be expressed as $$L(D_t | A_{t-1}, D_{t-1}, c_t) = \sum_{x \in N_{t-1}} \log p(\hat{d}_{x,t} | A_{x,t-1}, d_{x,t-1}) \quad \text{EQUATION (10)}$$

where, for notational convenience, data from the previous frame is denoted by $D_{t-1} \equiv \{d_{x,t-1}\}_{x \in N_{t-1}}$, where an individual datum is $d_{x,t-1} \equiv d(x,t-1)$. Similarly, the current data warped back into the previous frame of reference are denoted by $\hat{d}_{x,t} \equiv d(w(x;c_t),t)$, and finally, the inventors define $A_{x,t-1} \equiv (m_{x,t-1}, q_{x,t-1})$. Intuitively, this log-likelihood can be understood as follows: data at the current frame t are warped back to the coordinates of frame t−1 according to the parameters $c_t$. The log-likelihood of this warped data $\{\hat{d}_{x,t}\}_{x \in N_{t-1}}$, is then computed with respect to the appearance model $A_{t-1}$ in the frame of the reference of the target region $N_{t-1}$ in the previous frame.

A prior is introduced mainly to cope with occlusions, and to exploit the persistence of the stable component S. The inventors take the prior density over the motion parameters $c_t = (u_t, \theta_t, \rho_t)$ conditioned on the motion at time t−1, $c_{t-1}$, to be a product of two 4D Gaussians:

$$p(c_t | c_{t-1}) = G(c_t; \vec{\eta}, V_1) \, G(c_t; c_{t-1}, V_2) \quad \text{EQUATION (11)}$$

The first Gaussian factor prefers slow motions, with its mean equal to the identity warp $\vec{\eta}$, and its covariance given by $V_1 \equiv \text{diag}(8^2, 8^2, 0.05^2, 0.01^2)$. The second Gaussian prefers slow changes in motion, with $V_2 \equiv \text{diag}(1, 1, 0.02^2, 0.01^2)$.

To estimate $c_t$, the sum of the log-likelihood and the log-prior given is maximized by $$E(c_t) = L(D_t | A_{t-1}, D_{t-1}, c_t) + \log p(c_t | c_{t-1}) \quad \text{EQUATION (12)}$$

To maximize $E(c_t)$ a straightforward variant of the expectation-maximization (EM) algorithm is used, as described by A. Jepson and M. J. Black in "Mixture Models for Optical Flow Computation", In *Proc. IEEE Computer Vision and Pattern Recognition, CVPR-93*, pages 760–761, New York, June 1993. This is an iterative, coarse-to-fine algorithm, with annealing used to control the method becoming trapped in local minima. In short, the E-step determines the ownership probabilities for the backwards warped data $\hat{D}_t$, as in Equation (3) above. The M-step uses these ownerships to form a linear system for the update to $c_t$. These components of the linear system are obtained from the motion constraints weighted by the ownership probabilities for the W and S processes.

The derivation of the EM algorithm here begins with the fact that extrema of $E(c_t)$ satisfy $$\frac{\partial}{\partial c_t} E(c_t) = \quad \text{EQUATION (13)}$$

$$\frac{\partial}{\partial c_t} L(D_t | A_{t-1}, D_{t-1}, c_t) + \frac{\partial}{\partial c_t} \log p(c_t | c_{t-1}) = 0$$

With the warped data denoted by $\hat{d}_{x,t} \equiv d(w(x;c_t),t)$, as in Equation (10), the derivative of the log-likelihood is $$\frac{\partial}{\partial c_t} L(D_t | A_{t-1}, D_{t-1}, c_t) = \quad \text{EQUATION (14)}$$

$$\sum_{x \in N_{t1}} \frac{\partial}{\partial c_t} \log p(\hat{d}_{x,t} | A_{x,t-1}, d_{x,t-1})$$

Exploiting the identity, $$\frac{\partial}{\partial x} \log(f(x)) = \frac{1}{f(x)} \frac{\partial}{\partial x} f(x),$$

and expanding the likelihood function according to Equation (1), Equation (14) is simplified as follows:

$$\frac{\partial}{\partial c_t} L(D_t | A_{t-1}, D_{t-1}, c_t) = \sum_{x \in N_{t1}} \frac{m_w}{p(\hat{d}_{x,t} | A_{x,t-1}, d_{x,t-1})} \frac{\partial}{\partial c_t} p_w(\hat{d}_{x,t} | d_{x,t-1}) +$$

-continued $$\sum_{x \in N_{t1}} \frac{m_s}{p(\hat{d}_{x,t} \mid A_{x,t-1}, d_{x,t-1})} \frac{\partial}{\partial c_t} p_s(\hat{d}_{x,t} \mid q_{t-1})$$

$$= \sum_{x \in N_{tI}} \frac{m_w p_w(\hat{d}_{x,t} \mid d_{x,t-1})}{p(\hat{d}_{x,t} \mid A_{x,t-1}, d_{x,t-1})} \frac{\partial}{\partial c_t} \log p_w(\hat{d}_{x,t} \mid d_{x,t-1}) +$$

$$\sum_{x \in N_{tI}} \frac{m_s p_s(\hat{d}_{x,t} \mid q_{t-1})}{p(\hat{d}_{x,t} \mid A_{x,t-1}, d_{x,t-1})} \frac{\partial}{\partial c_t} \log p_s(\hat{d}_{x,t} \mid q_{t-1})$$

Finally, defining ownership probabilities as $$o_w(\hat{d}_{x,t}) = \frac{m_w p_w(\hat{d}_{x,t} \mid d_{x,t-1})}{p(\hat{d}_{x,t} \mid A_{x,t-1}, d_{x,t-1})},$$

$$o_s(\hat{d}_{x,t}) = \frac{m_s p_s(\hat{d}_{x,t} \mid q_{t-1})}{p(\hat{d}_{x,t} \mid A_{x,t-1}, d_{x,t-1})}$$

EQUATION (15)

the expression for the gradient of the log-likelihood is simplified to $$\frac{\partial}{\partial c_t} L(D_t \mid A_{t-1}, D_{t-1}) = \sum_{x \in N_{t1}} o_w(\hat{d}_{x,t}) \frac{\partial}{\partial c_t} \log p_w(\hat{d}_{x,t} \mid d_{x,t-1}) +$$

$$\sum_{x \in N_{t1}} o_s(\hat{d}_{x,t}) \frac{\partial}{\partial c_t} \log p_s(\hat{d}_{x,t} \mid q_{t-1})$$

EQUATION (16)

Combining Equation (16) with the derivative of the log-prior, which is straightforward to derive from Equation (11), provides the form of the gradient of the objective function:

$$\frac{\partial}{\partial c_t} E(c_t) = \sum_{x \in N_{t1}} o_w(\hat{d}_{x,t}) \frac{\partial}{\partial c_t} \log p_w(\hat{d}_{x,t} \mid d_{x,t-1}) + \sum_{x \in N_{t1}} o_s(\hat{d}_{x,t}) \frac{\partial}{\partial c_t} \log p_s(\hat{d}_{x,t} \mid q_t) -$$

$$V_1^{-1}(c_t - \vec{\eta}) - V_2^{-1}(c_t - c_{t-1}).$$

EQUATION (17)

The EM algorithm is an iterative method for maximizing $E(c_t)$. In the E-step, given a current guess for the motion parameters, $c_t$ the ownership probabilities, $o_w(\hat{d}_{x,t})$ and $o_s(\hat{d}_{x,t})$ are computed with the motion parameters held fixed. In the subsequent M-step, an update to the motion parameters, $\delta c$, is estimated by maximizing the objective function with the ownership probabilities held fixed.

Here, the M-equations are not solved directly. Instead, similar to the way in which optical flow is often estimated with gradient-based constraints, an approximate objective function is maximized. The approximate function, $\tilde{E}(\delta c; c_t)$, is obtained by linearizing the current observations about the initial guess, $c_t$ for the motion parameters. In particular, $d(w(x;c_t),t)$ is approximated by its first order Taylor series taken about $c_t$. More formally, $$d(w(x; c_t + \delta c), t) \approx d(w(x; c_t), t) + \nabla d(w(x; c_t), t) W \delta c \quad \text{EQUATION (18)}$$

where $\nabla d(x,t) \equiv (d_x(x,t), d_y(x,t))$ denotes the spatial partial derivatives of the data observations, and where $W = \delta w / \delta c_t$ denotes the 2×4 Jacobian of the warp map at $c_t$. By substituting this approximation for $d(w(x;c_t+\delta c),t)$ into the objective function, the following form is obtained for the stable component of the appearance models:

$$\log p_s(d(w(x; c_t + \delta c), t) \mid q_t) \approx \qquad \text{EQUATION (19)}$$

-continued $$\kappa_s - \frac{1}{2\sigma_{s,t}^2}[\delta d_s + \nabla dW \delta c_t]^2$$

where $\delta d_s \equiv d(w(x;c_t),t) - \mu_{s,t}$, $q = (\mu_{s,t}, \sigma_{s,t})$, are the mean and standard deviation of the S appearance model component, $\nabla d = \nabla d(w(x;c_t),t)$, and $\kappa_s$ is a constant that is independent of $c_t$. Similarly, for the W component of the appearance model, $$\log p_w(d(w(x; c_t + \delta c), t) \mid d_{x,t-1}) \approx \qquad \text{EQUATION (20)}$$

-continued $$\kappa_w - \frac{1}{2\sigma_w^2}[\delta d_w + \nabla dW\delta c]^2$$

where, $\delta d_w \equiv d(w(x;c_t),t) - d(x,t-1) - d(w(x,t-1))$ and $\kappa_w$ is a constant that is independent of $c_t$.

With these linearizations, the approximate objective function is then given by $$\tilde{E}(\delta c; c_t) = \kappa - \sum_{x \in N_t 1} \frac{o_w(\hat{d}_{x,t})}{2\sigma_w^2}[\delta d_w + \nabla d^T W\delta c]^2 - \sum_{x \in N_t 1} \frac{o_s(\hat{d}_{x,t})}{2\sigma_s^2}[\delta d_s + \nabla d^T W\delta c]^2 -$$

$$\frac{1}{2}(c_t + \delta c_t - \eta^s)^T V_1^{-1}(c_t + \delta c - \eta^s) - \frac{1}{2}(c_t + \delta c_t + \delta c_t - c_{t-1})^T V_2^{-1}(c_t + \delta c - c_{t-1})$$

EQUATION (21)

where $\mathcal{K}$ is a constant independent of $c_t$. Because the approximate objective function is quadratic in the update, $\delta c$, its derivative yields a linear system for $\delta c$:

$$\frac{\partial}{\partial c_t}\tilde{E}(\delta c; c_t) = -\sum_{x \in N_t 1}\left(\frac{o_w(\hat{d}_{x,t})}{2\sigma_w^2}[2\delta d_w W\nabla d + 2W^T \nabla d \nabla d^T W\delta c]\right) -$$

$$\sum_{x \in N_t 1}\left(\frac{o_s(\hat{d}_{x,t})}{2\sigma_s^2}[2\delta d_s W\nabla d + 2W^T \nabla d \nabla d^T W\delta c]\right) -$$

$$V_1^{-1}(c_t - \vec{\eta}) - V_1^{-1}\delta c - V_2^{-1}(c_t - c_{t-1}) - V_2^{-1}\delta c$$

EQUATION (22)

Alternatively the resulting linear equations for the update $\delta c$ can be written as $$(A_s + \epsilon A_w + A_p)\delta c = b_s + \epsilon b_w + b_p \quad \text{EQUATION (23)}$$

where each $A_i$ is a 4×4 matrix and each $b_i$ is a 4-vector, for i=w,s,p:

$$A_w = \sum_{x \in N_{t1}} \frac{\sigma_w(\hat{d}_{x,t})}{\sigma_w^2} W^T \nabla d \nabla d^T W, \quad b_w = -\sum_{x \in N_{t1}} \frac{\sigma_w(\hat{d}_{x,t})}{\sigma_w^2} \delta d_w W \nabla d$$

$$A_s = \sum_{x \in N_{t1}} \frac{\sigma_s(\hat{d}_{x,t})}{\sigma_s^2} W^T \nabla d \nabla d^T W, \quad b_s = -\sum_{x \in N_{t1}} \frac{\sigma_s(\hat{d}_{x,t})}{\sigma_s^2} \delta d_s W \nabla d$$

$$A_p = V_1^{-1} + V_2^{-1}, \quad b_p = -V_1^{-1}(c_t - \eta^+) - V_2^{-1}(c_t - c_{t-1})$$

Each linear equation in this system is formed from a different motion constraint, weighted by the ownership probabilities for the W and S components, respectively. In Equation (23), $\epsilon$ is a weighting factor for the W component constraints. A mathematically proper M-step for maximizing the approximate objective function of Equation (21) would use the weight $\epsilon=1$. The inventors have found it useful to downweight the constraints owned by the W component by a factor of $\epsilon=1/n_s$, where $n_s$ is the half-life of the exponential temporal window used in the appearance model. In addition, the method described by D. J. Fleet and A. D. Jepson, "Stability of Phase Information" (cited above) is used to detect local phase instabilities that occur with band-pass signals. Whenever a local phase observation, $d_{x,t}$, is deemed unstable, the corresponding gradient constraints are undefined and not included in Equation (23). When an unstable observation at time t−1 maps to a good observation at time t under the current warp, then the likelihood $p_w(d_{x,t}, d_{x,t-1})$ is undefined. Instead, $p_w=0.05$ is used when the previous observation was deemed unstable. Also, the corresponding W component constraints are removed from the linear system by setting $\epsilon$ to 0 in these cases.

In practice, to help avoid becoming stuck in local minima, it is useful to apply the EM algorithm with a coarse-to-fine strategy and deterministic annealing in fitting the motion parameters (e.g., see, for example, A. Jepson and M. J. Black, "Mixture Models for Optical Flow Computation," Proc. IEEE Computer Vision and Pattern Recognition, CVPR-93, pages 760–761, New York, June 1993). The initial guess for the warp parameters is based on a constant velocity model, so the initial guess is simply equal to the estimated warp parameters from the previous frame. By way of annealing, instead of using the variances $\sigma^2_{s,t}$ and $\sigma^2_{w,t}$ in computing the ownerships and gradients of Equation (22) for the S and W components, the parameters $\sigma_s$ and $\sigma_w$ are used. At each iteration of the EM-algorithm, these values are decreased according to $$\sigma_S \leftarrow \min(0.95\sigma_S, \hat{\sigma}_S)$$

$$\sigma_W \leftarrow \min(0.95\sigma_W, \hat{\sigma}_W) \quad \text{EQUATION (24)}$$

where $\hat{\sigma}_s$ and $\hat{\sigma}_w$ are the maximum likelihood variance estimates of the S component and W component phase differences, over the entire neighborhood, $N_t$, given the motion estimate obtained in the current EM iteration. Once the variances reach a minimal value the annealing is turned off and they are allowed to fluctuate according to the current motion parameters. Moreover, as the variance of the S component decreases according to the spatial ensemble of data observations at each EM iteration, the variances used for each individual observation in computing ownerships and likelihood gradients are never allowed to be lower than the corresponding variance of $\sigma^2_{s,t}$.

Finally, once the warp parameters $c_t$ have been determined, the appearance model $A_{t-1}$ is convected (warped) forward to the current time t using the warp specified by $c_t$.

To perform this warp, a piecewise constant interpolant is used for the WSL state variables m(x,t−1) and $\sigma_s$(x,t−1). This interpolation was expected to be too crude to use for the interpolation of the mean $\mu_s$(x,t−1) for the stable process, so instead the mean is interpolated using a piecewise linear model. The spatial phase gradient for this interpolation is determined from the gradient of the filter responses at the nearest pixel to the desired location x on the image pyramid sampling grid (see D. J. Fleet, A. D. Jepson, and M. Jenkin, "Phase-Based Disparity Measurement," *Computer Vision and Image Understanding*, 53(2):198–210, 1991).

A tracking system utilizing the WSL appearance model in the manner set forth above was implemented by the inventors using a SUN workstation running a Unix operating system, and written in the C programming language employing one or more of the MatlabPyrTools and MatLab software toolboxes. Various examples describing the performance of this implemented tracking system are described below.

FIGS. 10(A) through 10(C) illustrate images taken from a sequence during which a subject walking in a first direction (i.e., left to right in the image frame, FIG. 10(A)) turns toward the camera (FIG. 10(B)), and then walks in the opposite direction (i.e., from right to left, FIG. 10(C)). This example illustrates the ability of the S component to adapt to gradual deformations caused by rotation of a 3D target object (e.g., the subject's head). In FIGS. 10(A) through 10(C), the lightened oval indicates a manually selected object region selected in the first frame. That the oval remains fixed on the subject's head during the turning process is indicative of successful tracking.

As demonstrated in FIGS. 11(A) through 13(B), the success of the tracking system is greatly influenced by the ability of the S component to identify stable image structure throughout the subject's turn. FIGS. 11(A) and 11(B) depict the mixing probability and mean value, respectively, for the multiple data streams generated by the image frame of FIG. 10(A). Darkened regions of FIG. 11(A) indicates densely packed regions of relatively high mixing probability values (denoting stable structure), while lighter regions indicate low mixing probability values (denoting unstable structure). As indicated in regions 1110 and 1120, highly stable structure is identified in the areas of high contrast associated with the subject's eyes and ears, respectively. FIGS. 12(A) and 12(B) depict changes to the mixing probability and mean values as the subject turns (shown in FIG. 10(B)). Note that the mixing probabilities in eye region 1210 and ear region 1220 remain relatively high, indicating that stable image data is maintained in these regions. Finally, FIGS. 13(A) and 13(B) depict changes to the mixing probability and mean values after the subject's turn is completed (shown in FIG. 10(B)). Note that, although greatly reduced in number, sufficient stable data is obtained from eye region 1310 and ear region 1320 to facilitate successful tracking.

Figure 14A:
FIGS. 14(A) and 14(B) are composite photographs depicting the tracking of a 3D target object moving toward a camera.
Figure 14B:
Figure 15D:
FIGS. 15(B), 15(C), and 15(D) are diagrams depicting mixing probability, mean data value, and ownership data associated with the image data shown in FIG. 15(A)
Figure 15C:
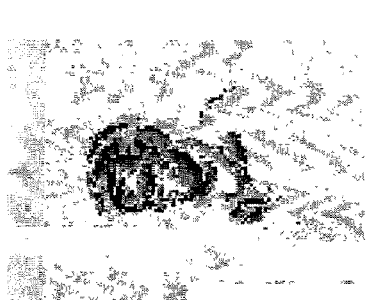
Figure 15B:
Figure 15A:
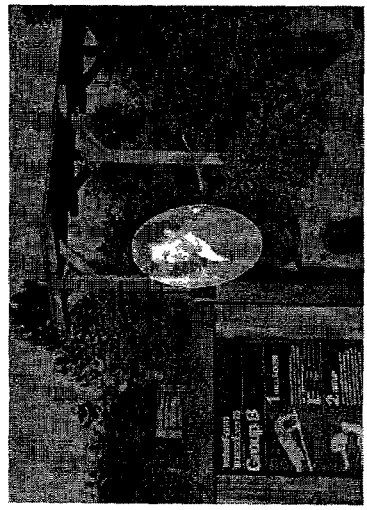
FIG. 15(A) is a photograph including image data associated with a target object before occlusion.
Figure 16D:
FIGS. 16(B), 16(C), and 16(D) are diagrams depicting mixing probability, mean data value, and ownership data associated with the image data shown in FIG. 16(A)
Figure 16C:
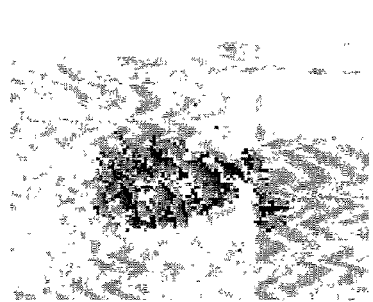
Figure 16B:
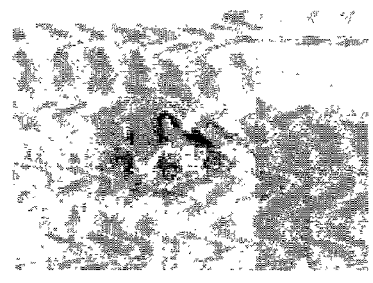
Figure 16A:
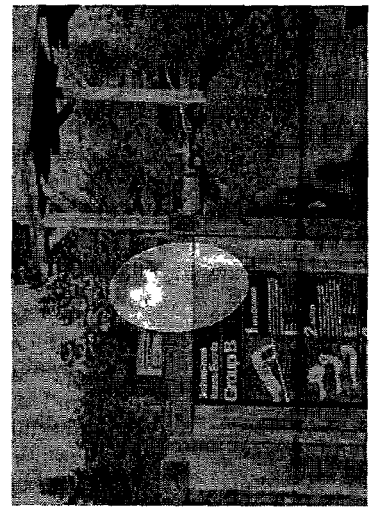
FIG. 16(A) is a photograph including image data associated with the target object of FIG. 15(A) at the beginning of occlusion.

FIGS. 14(A) and 14(B) are composite images illustrating the stability of the joint estimation of motion and appearance of the tracking system, despite significant changes in size and lighting conditions. Even more challenging for the current method are the (at times) small target regions, and the small separation of the object motion from the background motion (about a pixel per frame). Also, roughly half the target region is occluded by the bushes at times. The camera was stationary during filming, and the sequences are each roughly 250 frames. The two runs depicted in FIGS. 14(A) and 14(B) show the highlighted target region for selected frames superimposed on the last frame.

FIGS. 15(A) through 18(D) illustrate the behavior of the tracking system in response to partial occlusion. FIGS. 15(A), 16(A), 17(A), and 18(A) are selected image frames from the sequence during which the subject moves from an unoccluded initial state (FIG. 15(A)) to partial occlusion by a sign (FIGS. 16(A) and 17(A)), and finally reemerging from behind the sign (FIG. 18(A)). FIGS. 15(B)–18(B) plot the mixing probability $m_s$(x,t), FIGS. 15(C)–18(C) plot the the mean $\mu_s$(x,t), and FIGS. 15(D)–18(D) plot the ownership $o_{s,t}$(x,t) for the S component.

FIGS. 15(A)–15(D) illustrate processing after approximately 70 frames. The significant responses for $m_{s,t}$ and $o_{s,t}$ (FIGS. 15(B) and 15(D)) demonstrate that the appearance model successfully identified stable structure, typically inside the object boundary. In FIGS. 16(A)–16(D) and 17(A)–17(D), where the subject is occluded by the sign, note that $m_s$(x,t) decays smoothly in the occluded region due to the absence of data support, while the mean $\mu_s$(x,t) remains roughly fixed until $m_s$ falls below the plotting threshold. This clearly demonstrates the persistence of the appearance model. FIGS. 17(A)–17(D) depict the subject and appearance model after roughly 20 frames of occlusion (recall the half-life of the model is $n_s$=20), by which time the weaker data points in the S component have disappeared. However, the model continues to track through this occlusion event and maintains the stable model on the visible portion of the subject (e.g., region 1710; FIG. 17(D)). In FIGS. 18(A)–18(D), when the person emerges from behind the occlusion, the appearance model rebuilds the dissipated stable model.

FIGS. 19(A)–22(B) illustrate an ability of the WSL appearance model to track and identify stable properties in images of nonrigid (e.g., natural) objects, such as the change of expression shown in the series of images shown in FIGS. 19(A)–19(C). As in the examples above, FIGS. 20(A), 21(A), and 22(A) illustrate mixing probabilities of the S component, and FIGS. 20(A), 21(A), and 22(A) illustrate respective mean values. Referring to FIG. 20(A), notice that mouth region 2010 is initially identified as relatively stable. In FIG. 21(A)), immediately after the subject smiles, the stability in mouth region 2110 is weakened significantly (indicated by the lighter shading). As shown in FIG. 22(A), once the new expression has been held for about 20 frames, stability in mouth region 2210 is reestablished. Other parts of the face, such as the eyebrows, show similar behavior. Conversely, the values of $m_s$ near the hairline and on nose continue to increase through these events, indicating that they are consistently stable and, overall, the head is being accurately tracked.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

The invention claimed is:

1. A method for generating an appearance model utilizing image data provided in a plurality of sequential image frames, the appearance model defined by a stable component including a first mixing probability and a first data parameter that is calculated using a plurality of image data values respectively provided in a relatively large number of said sequential image frames, the relatively large number being greater than three, the appearance model also including a transient component having a second mixing probability and second data parameter that is calculated using a plurality of image data values respectively provided in a relatively small number of said sequential image frames, wherein the method comprises:

receiving an image datum corresponding to a most current image frame of the plurality of sequential image frames;

determining a first likelihood value for the stable component and a second likelihood value for the transient component, the first likelihood value indicating a relative consistency between the image datum and the first data parameter, and the second likelihood value indicating a relative consistency between the image datum and the second data parameter; and updating the first mixing probability of the stable component and the second mixing probability of the transient component using the first and second likelihood values, respectively.

2. The method according to claim 1, further comprising filtering the image datum before determining the first and second likelihood values.

3. The method according to claim 2, wherein the filtering is performed using a steerable pyramid.

4. The method according to claim 1, wherein determining the likelihood comprises comparing the first data parameter with the image datum.

5. The method according to claim 1, further comprising updating said first data parameter and said second data parameter after updating said first and second mixing probabilities.

6. The method of claim 5, further comprising resetting said first and second mixing probabilities when said first mixing probability falls below a preset minimum value.

7. The method of claim 6, further comprising resetting the first data parameter to the image datum value when the first mixing probability is reset.

8. A method for tracking a selected target object comprising:

receiving a current image frame including image datum associated with of the target object;

estimating a motion of the target object using an adaptive appearance model including a first image component having parameters that are calculated using a plurality of image data values respectively received over a relatively large number of image frames temporally preceding the current image frame, the relatively large number being greater than three, and a second image component having parameters that are calculated using a plurality of image data values respectively over the relatively small number of said sequential image frames temporally preceding the current image frame; and updating the first and second image components, wherein the parameters of the first component include a first data parameter and a first contribution parameter, wherein the parameters of the second component include a second data parameter and a second contribution parameter, and wherein updating the first and second components comprises:

comparing the image datum of the current image frame with the first data parameter of the first component, and recalculating the first and second contribution parameters based upon a difference between the first data parameter and the image datum.

9. The method according to claim 8, wherein the first contribution parameter comprises a mean value and a variance value calculated from a plurality of image data received in said relatively large number of image frames temporally preceding the current image frame, and wherein comparing comprises determining a likelihood value determined by a difference between the image datum and the mean and variance values.

10. The method of claim 9, further comprising calculating a first ownership probability for the first component using the likelihood value.

11. The method according to claim 9, further comprising recalculating the mean and variance values using the likelihood value.

12. An adaptive appearance model implemented on a processor-controlled machine for identifying an object appearing in a plurality of sequential image frames, the adaptive appearance model comprising:

a first image component having parameters defined by image data that remains stable over a relatively large number of said sequential image frames, the relatively large number being greater than three, wherein the parameters of the first image component include a first parameter that is calculated using a plurality of image data values respectively provided in said relatively large number of sequential frames; and a second image component having parameters defined by a relatively small number of said sequential image frames, and means for updating said first and said image components after receiving a current image frame of the plurality of sequential image frames, wherein the parameters of the first component include the first data parameter and a first contribution parameter, wherein the parameters of the second component include a second data parameter and a second contribution parameter, and wherein said means for updating comprises:

means for comparing the image datum of the current image frame with the first data parameter of the first component, and means for recalculating the first and second contribution parameters based upon a difference between the first data parameter and the image datum.

13. The appearance model according to claim 12, wherein the first contribution parameter comprises a mean value and a variance value calculated from a plurality of image data received in at least some of said plurality of sequential image frames temporally preceding the current image frame, and wherein the appearance model further comprises means for determining a likelihood value determined by a difference between the image datum and the mean and variance values.

14. The appearance model according to claim 13, further comprising means for calculating a first ownership probability for the first component using the likelihood value.

15. The appearance model according to claim 13, further comprising means for recalculating the mean and variance values using the likelihood value.

16. An adaptive appearance model implemented on a processor-controlled machine for identifying an object appearing in a plurality of sequential image frames, the adaptive appearance model comprising:

a first image component including a first mixing probability having a value that is determined by a first parameter that is calculated using a plurality of image data values respectively provided in a relatively large number of said sequential image frames, the relatively large number being greater than three;

a second image component including a second mixing probability having a value determined by a relatively small number of said sequential image frames, and an outlier component including a third mixing probability that is determined by the occurrence of outliers in the image data received in the plurality of image frames.

17. The adaptive appearance model according to claim 16, further comprising:

means for receiving a current image frame; and means for updating said first, second, and third mixing probabilities in accordance with image datum received in the current image frame.

* * * * *